US010422496B2

(12) United States Patent
Patton et al.

(10) Patent No.: US 10,422,496 B2
(45) Date of Patent: Sep. 24, 2019

(54) ELECTRIC LIGHTING DEVICE

(71) Applicant: L&L Candle Company, LLC, Eden Prairie, MN (US)

(72) Inventors: Douglas Patton, Irvine, CA (US); Kanchana Sanjaya Gunesekera Karunaratne, Escondido, CA (US); Gary Bordenkicher, Lake Forest, CA (US); Jeffrey Thompson, Huntington Beach, CA (US)

(73) Assignee: L&L Candle Company, LLC, Eden Prarie, MN (US)

( * ) Notice: Subject to any disclaimer, the term of this patent is extended or adjusted under 35 U.S.C. 154(b) by 0 days.

(21) Appl. No.: 15/913,596

(22) Filed: Mar. 6, 2018

(65) Prior Publication Data

US 2018/0372288 A1     Dec. 27, 2018

Related U.S. Application Data

(63) Continuation of application No. 15/400,715, filed on Jan. 6, 2017, now Pat. No. 9,909,729.

(Continued)

(51) Int. Cl.
*F21V 5/00* (2018.01)
*F21S 10/04* (2006.01)
(Continued)

(52) U.S. Cl.
CPC ............. *F21S 10/046* (2013.01); *F21S 6/001* (2013.01); *F21S 9/02* (2013.01); *F21S 10/04* (2013.01);
(Continued)

(58) Field of Classification Search
CPC . F21V 5/00; F21S 10/04; F21S 10/046; F21S 6/001; F21S 9/02; G02B 6/00; G02B 6/0096; F21W 2121/01; F21W 2121/002
See application file for complete search history.

(56) References Cited

U.S. PATENT DOCUMENTS 3,639,749 A   2/1972  Beckman
7,159,994 B2  1/2007  Schnuckle et al.
(Continued)

FOREIGN PATENT DOCUMENTS

CN   102734740     10/2012
CN   202747231 U   2/2013
(Continued)

*Primary Examiner* — Ali Alavi
(74) *Attorney, Agent, or Firm* — Law Office of Scott C Harris, Inc

(57) ABSTRACT

Electric lighting devices are described having a candle body with an upper surface coupled to a sidewall. A flame element is disposed entirely outside of the candle body and include one or more magnets or a ferrous material. The flame element is supported above the upper surface by a support member that extends upwardly from the upper surface and terminates at a first end disposed within the flame element. This allows the flame element some degree of movement about the support member that combined with a light source configured to illuminate a surface of the flame element creates a flickering flame effect. The device can also include a drive mechanism such as an electromagnet that generates an electromagnetic field that interacts with the magnets of the flame element to thereby cause movement of the flame element.

21 Claims, 39 Drawing Sheets

Related U.S. Application Data

(60) Provisional application No. 62/275,391, filed on Jan. 6, 2016, provisional application No. 62/367,366, filed on Jul. 27, 2016.

(51) Int. Cl.
*F21S 6/00* (2006.01)
*F21V 8/00* (2006.01)
*F21S 9/02* (2006.01)
*G02B 6/00* (2006.01)
*F21W 121/00* (2006.01)

(52) U.S. Cl.
CPC ............ *G02B 6/00* (2013.01); *G02B 6/0096* (2013.01); *F21W 2121/00* (2013.01); *F21W 2121/002* (2013.01)

(56) References Cited

U.S. PATENT DOCUMENTS

| | | | |
|---|---|---|---|
| 7,261,455 B2 | 8/2007 | Schnuckle et al. |
| 7,350,720 B2 | 4/2008 | Jaworski et al. |
| 7,481,571 B2 | 1/2009 | Bistritzky et al. |
| 7,503,668 B2 | 3/2009 | Perchia et al. |
| 7,686,471 B2 | 3/2010 | Reichow |
| 7,824,627 B2 | 11/2010 | Michaels et al. |
| 7,837,355 B2 | 11/2010 | Schnuckle |
| 8,070,319 B2 | 12/2011 | Schnuckle et al. |
| 8,132,936 B2 | 3/2012 | Patton et al. |
| 8,342,712 B2 | 1/2013 | Patton et al. |
| 8,534,869 B2 | 9/2013 | Patton et al. |
| 8,550,660 B2 | 10/2013 | Patton et al. |
| 8,646,946 B2 | 2/2014 | Schnuckle et al. |
| 8,696,166 B2 | 4/2014 | Patton et al. |
| 8,721,118 B2 | 5/2014 | Patton et al. |
| 8,727,569 B2 | 5/2014 | Schnuckle et al. |
| 8,789,986 B2 | 7/2014 | Li |
| 8,926,137 B2 | 1/2015 | Li |
| 9,133,992 B2 | 9/2015 | Lee |
| 9,377,181 B1 | 6/2016 | Lauer |
| 9,541,247 B2 | 1/2017 | Patton |
| 2001/0033488 A1 | 10/2001 | Chliwnyj et al. |
| 2005/0169666 A1 | 8/2005 | Porchia et al. |
| 2005/0285538 A1 | 12/2005 | Jaworski et al. |
| 2006/0034100 A1 | 2/2006 | Schnuckle et al. |
| 2006/0039835 A1 | 2/2006 | Nottingham et al. |
| 2006/0125420 A1 | 6/2006 | Boone et al. |
| 2007/0127249 A1 | 6/2007 | Medley et al. |
| 2008/0031784 A1 | 2/2008 | Bistritzky et al. |
| 2008/0038156 A1 | 2/2008 | Jaramillo |
| 2008/0130266 A1 | 6/2008 | DeWitt et al. |
| 2008/0150453 A1 | 6/2008 | Medley et al. |
| 2010/0079999 A1 | 4/2010 | Schnuckle |
| 2011/0027124 A1 | 2/2011 | Albee et al. |
| 2011/0127914 A1 | 6/2011 | Patton et al. |
| 2011/0317403 A1 | 12/2011 | Fournier et al. |
| 2012/0020052 A1 | 1/2012 | McCavit et al. |
| 2012/0024837 A1 | 2/2012 | Thompson |
| 2012/0093491 A1 | 4/2012 | Browder et al. |
| 2012/0134157 A1* | 5/2012 | Li .................... F21S 6/001 362/277 |
| 2012/0300459 A1 | 11/2012 | Hau et al. |
| 2014/0177212 A1 | 6/2014 | Li |
| 2014/0218929 A1 | 8/2014 | Schnuckle |
| 2014/0362592 A1 | 12/2014 | Lee |
| 2015/0109786 A1 | 4/2015 | Li |
| 2015/0362142 A1 | 12/2015 | Patton |
| 2017/0023196 A1* | 1/2017 | Li ..................... F21S 10/046 |
| 2017/0122541 A1* | 5/2017 | Patton ................ A61L 9/12 |
| 2017/0167677 A1* | 6/2017 | Patton ................ F21S 6/001 |

FOREIGN PATENT DOCUMENTS

| | | |
|---|---|---|
| CN | 202884785 U | 4/2013 |
| CN | 102721002 B | 6/2014 |
| EP | 1878449 A1 | 1/2008 |
| WO | 2006020839 | 2/2006 |
| WO | 2010039347 | 4/2010 |
| WO | 2012000418 | 1/2012 |
| WO | 2014036968 | 3/2014 |
| WO | 2015061623 A1 | 4/2015 |

\* cited by examiner

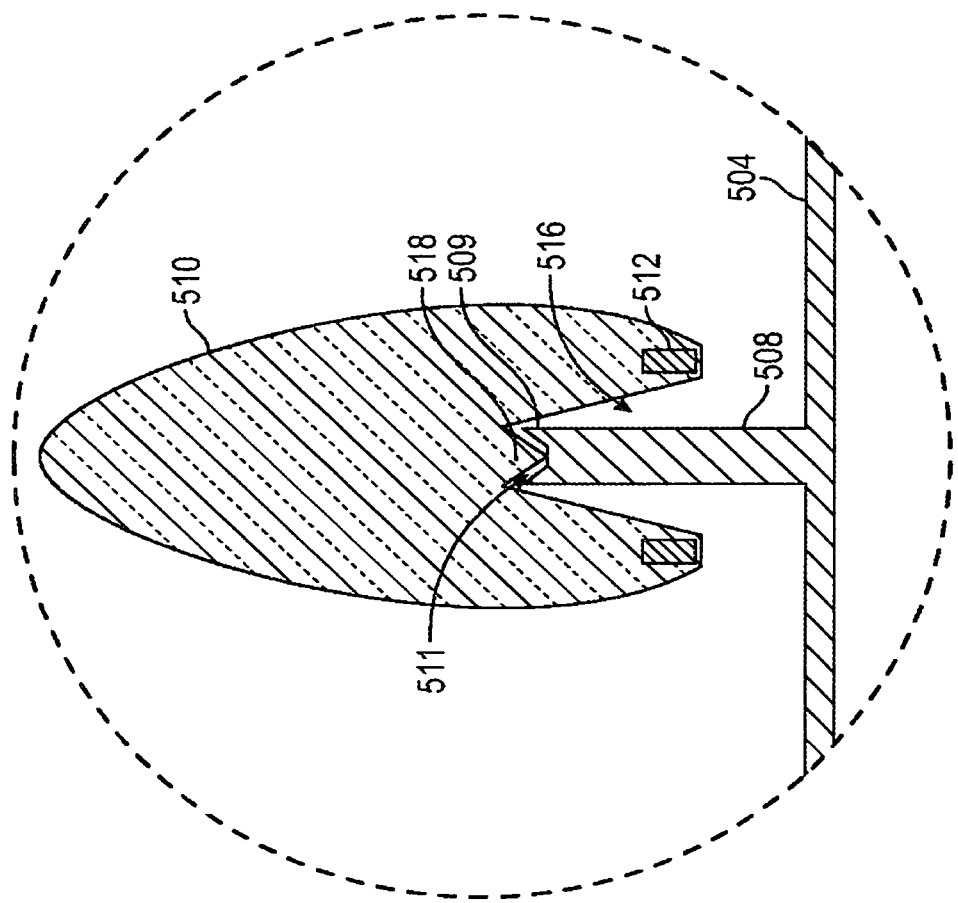
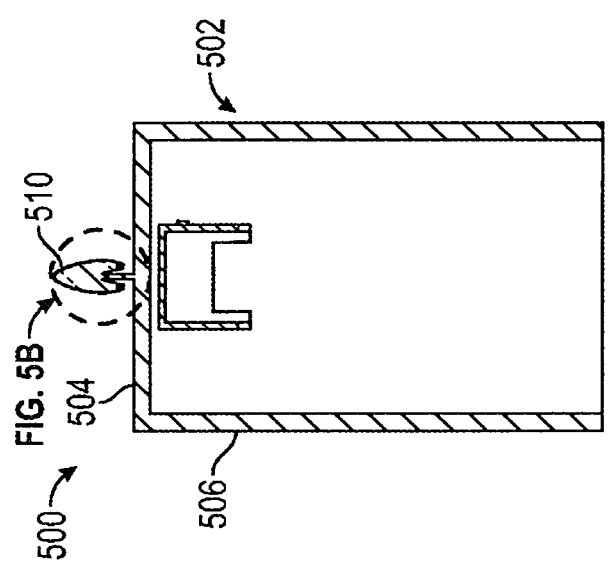

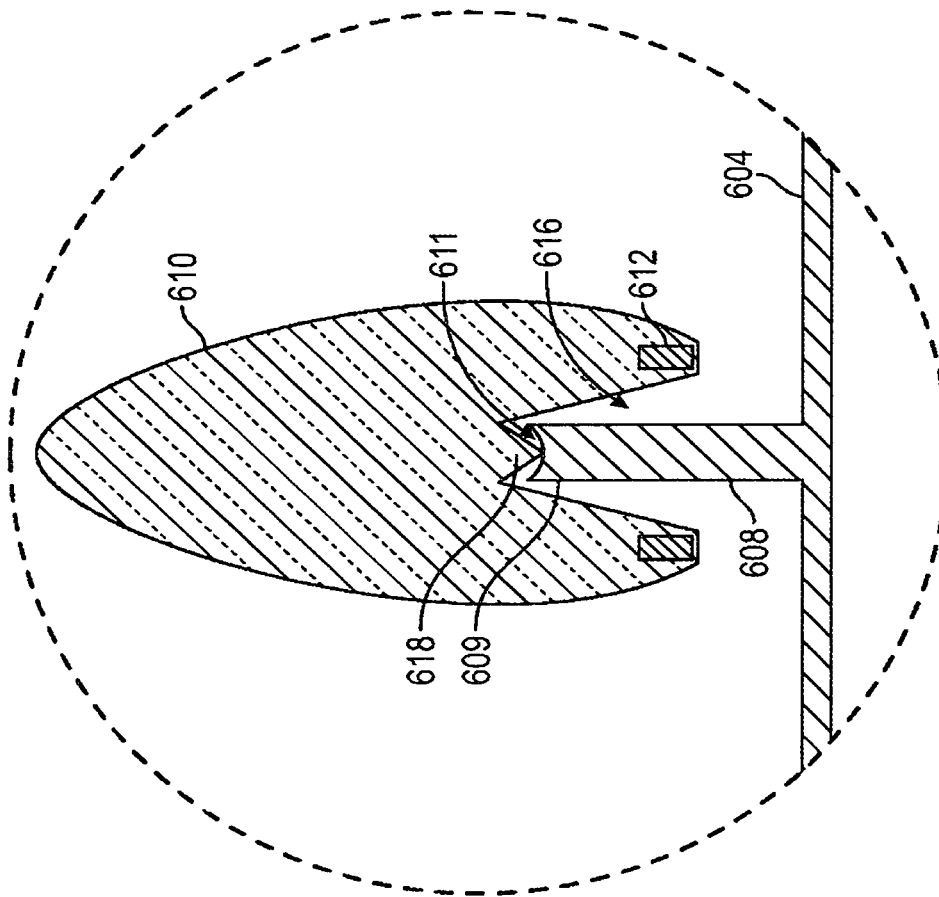
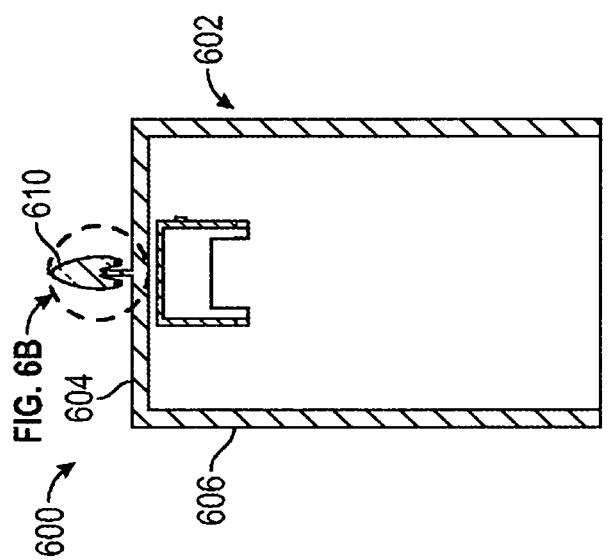

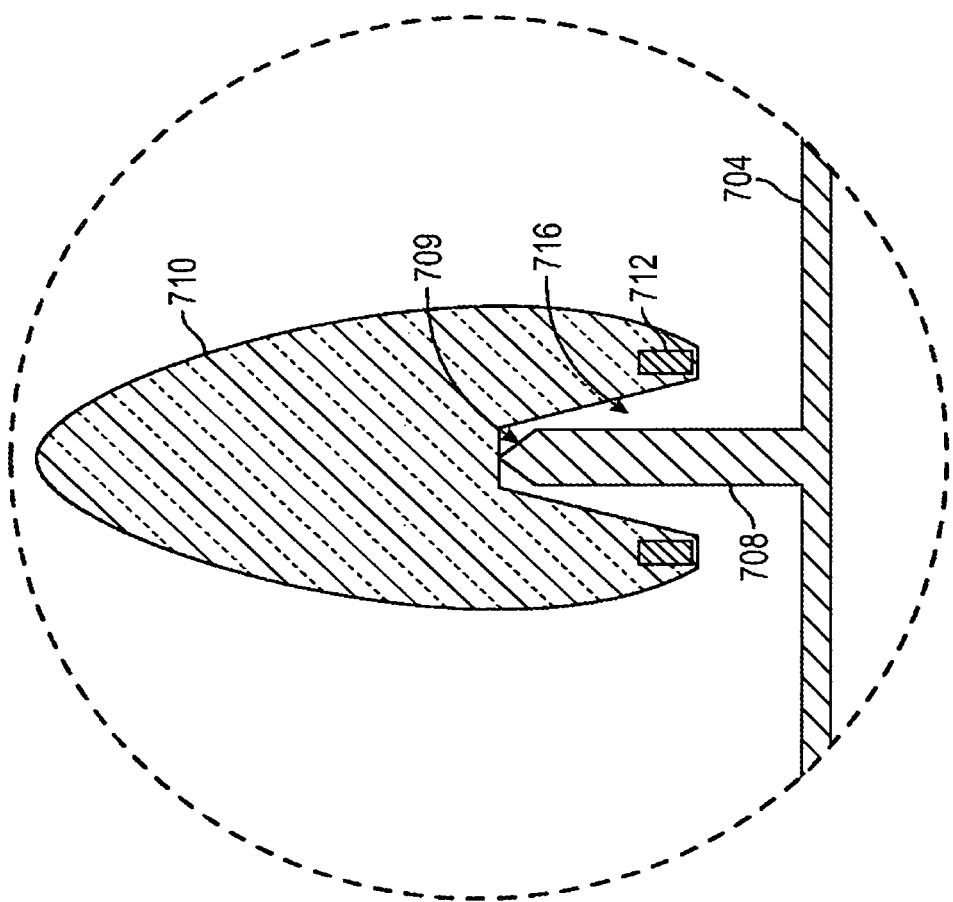
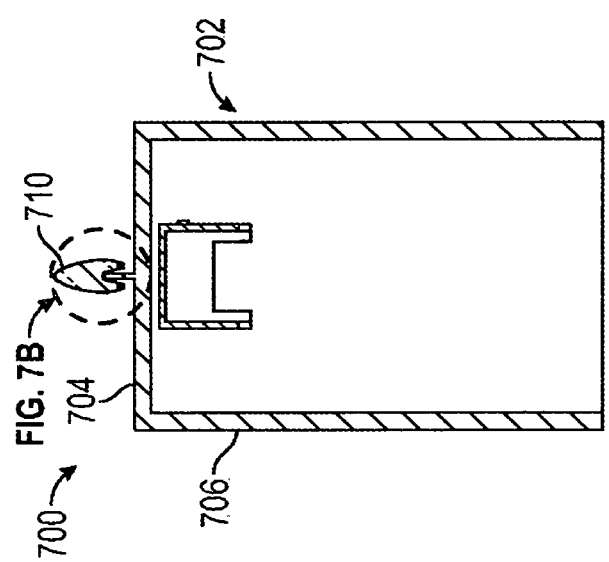
FIG. 7B
FIG. 7A

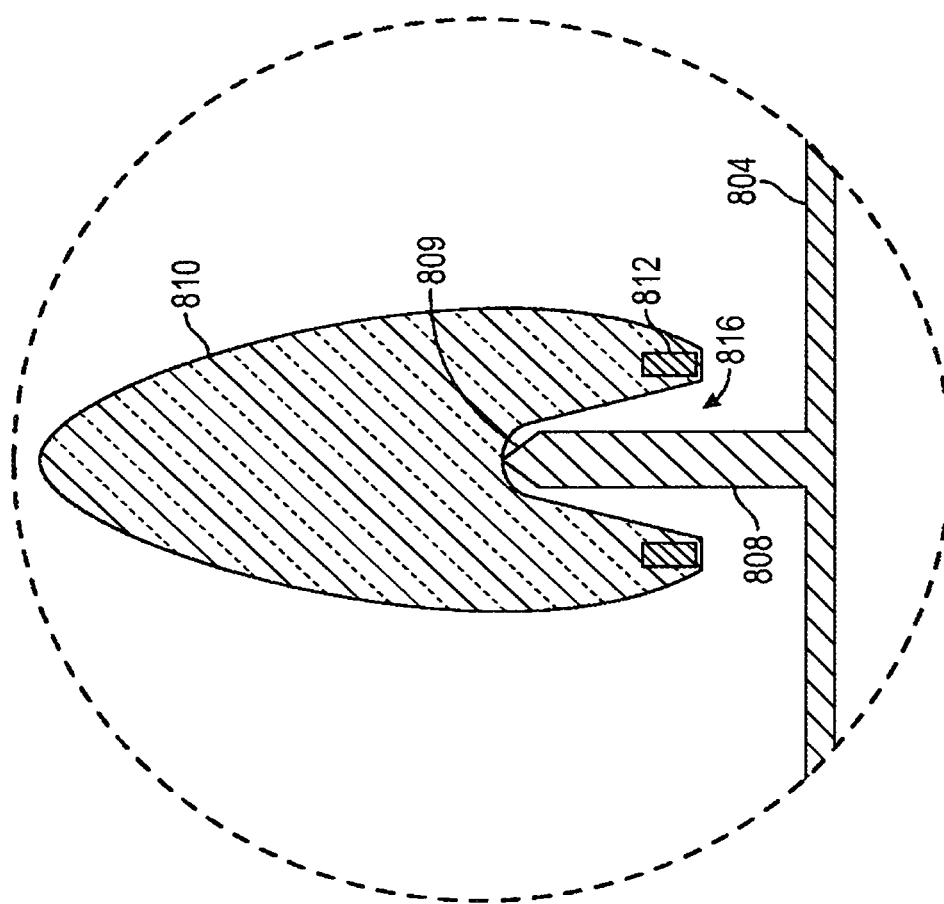
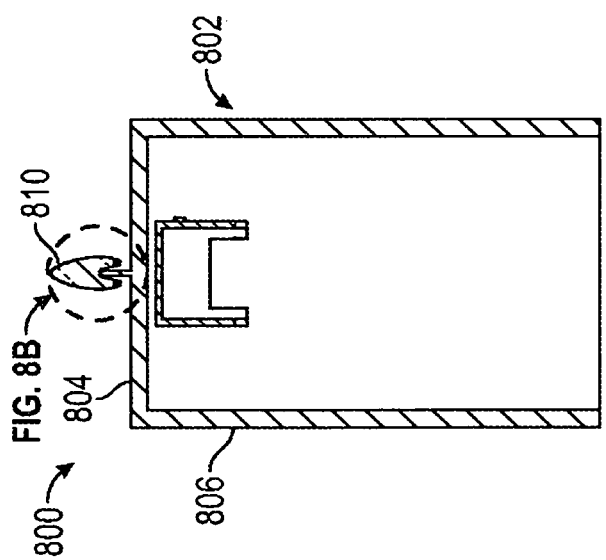

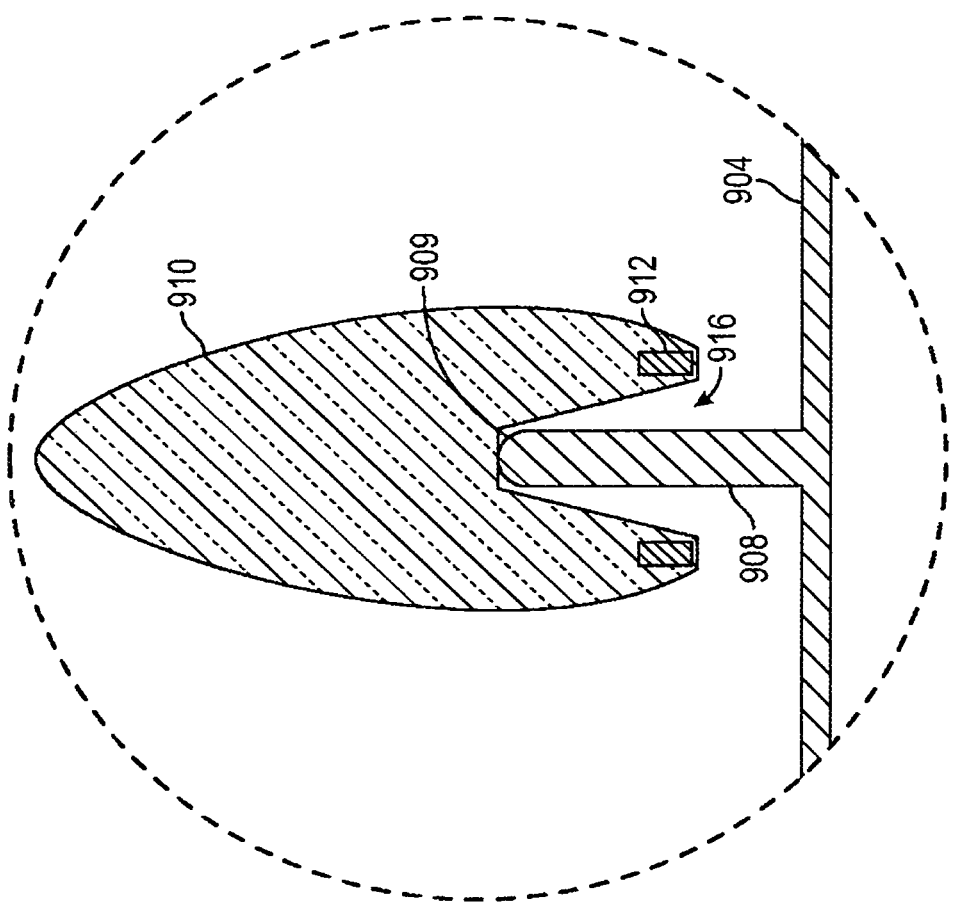
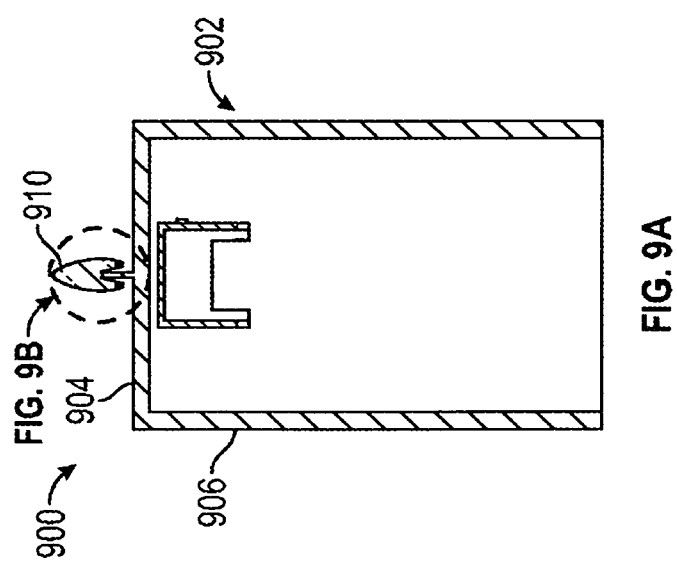

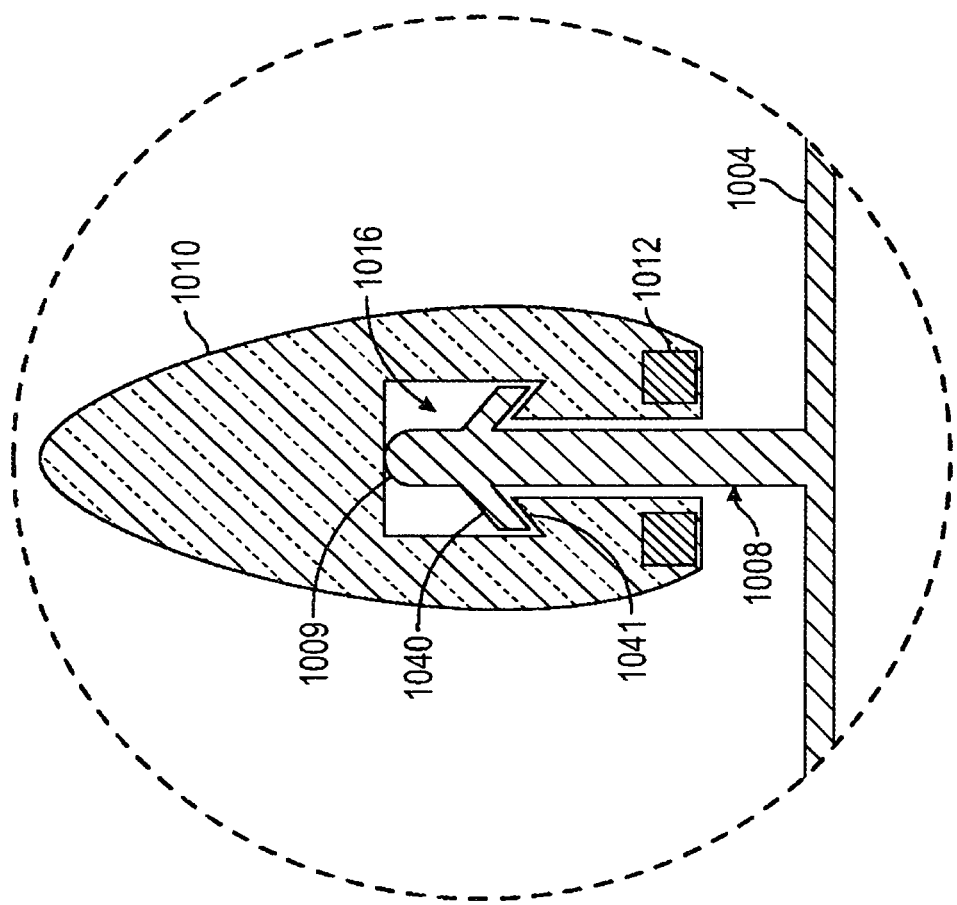
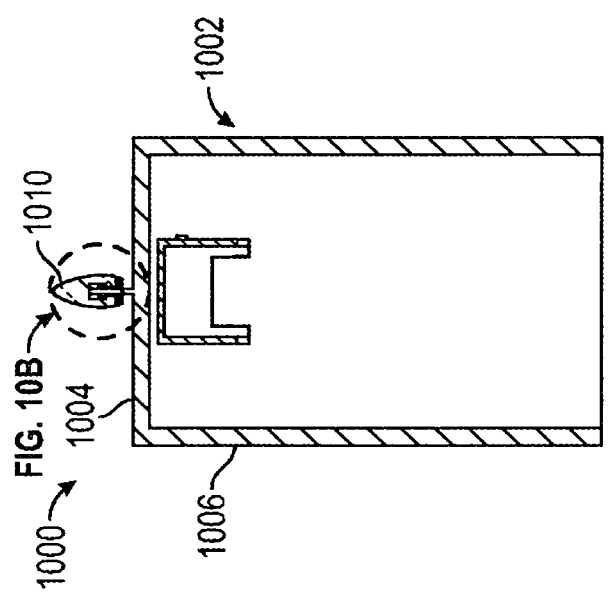
FIG. 10B
FIG. 10A

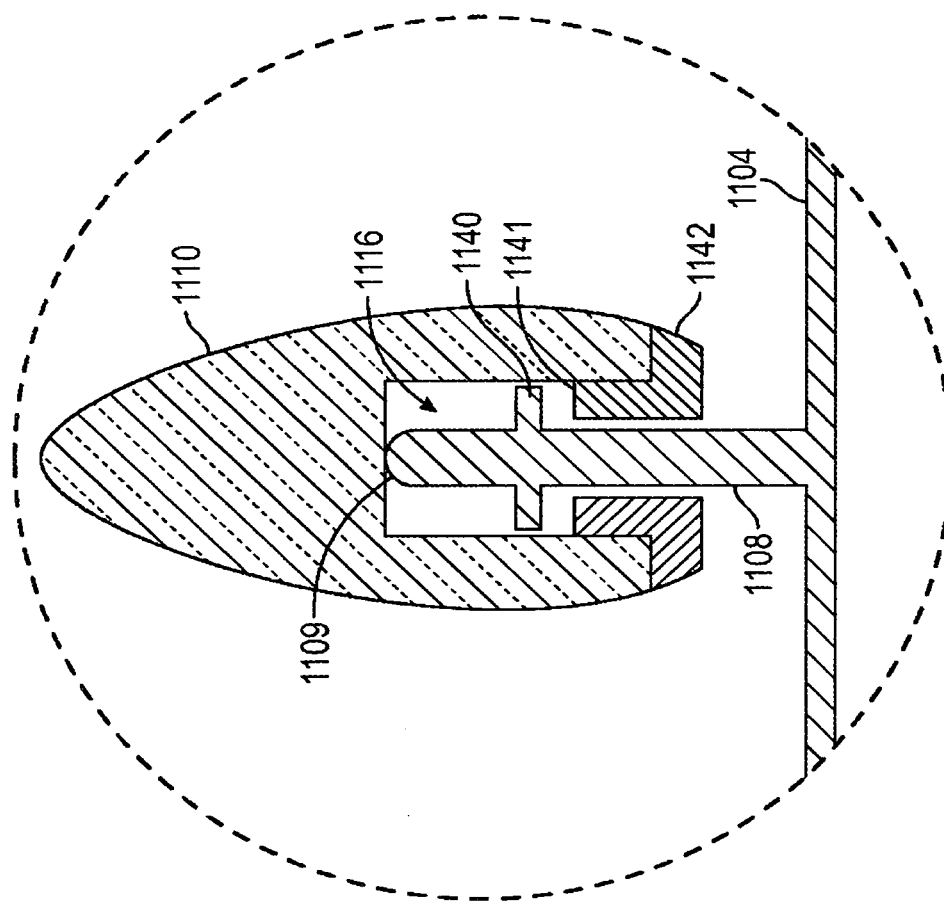
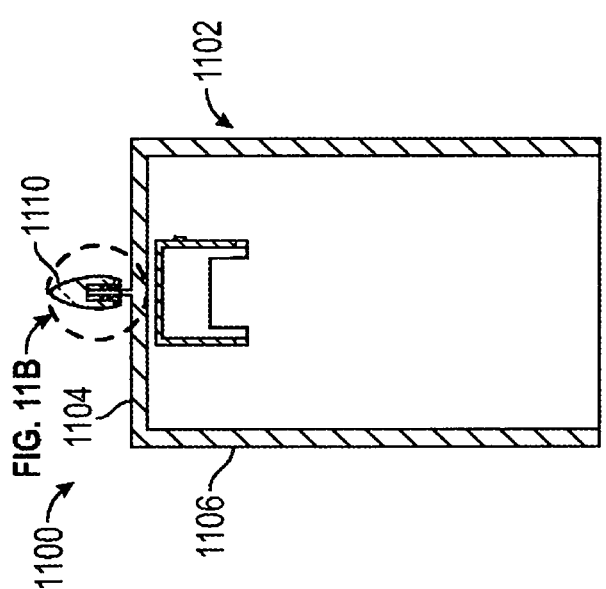
FIG. 11B
FIG. 11A

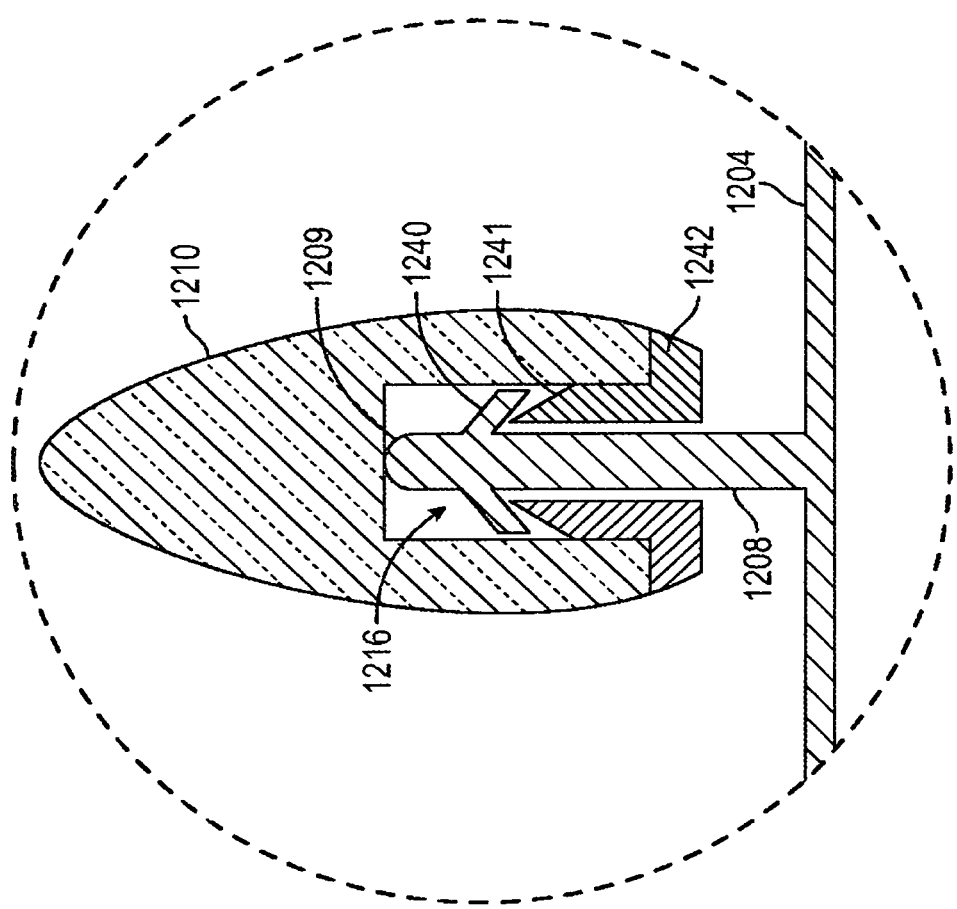
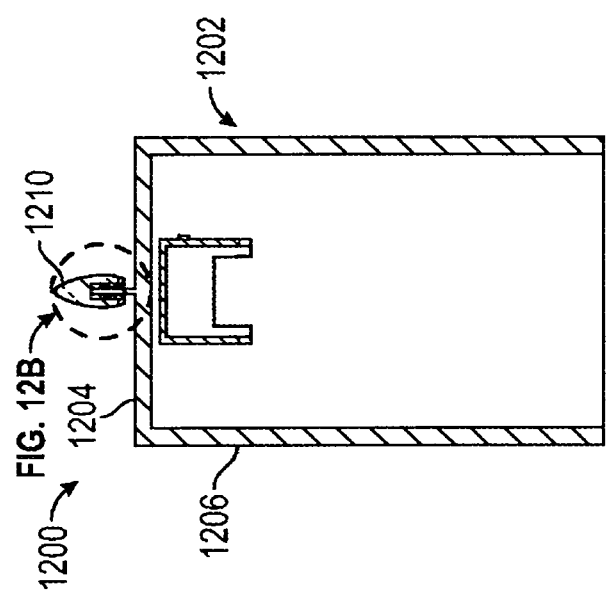
FIG. 12B
FIG. 12A

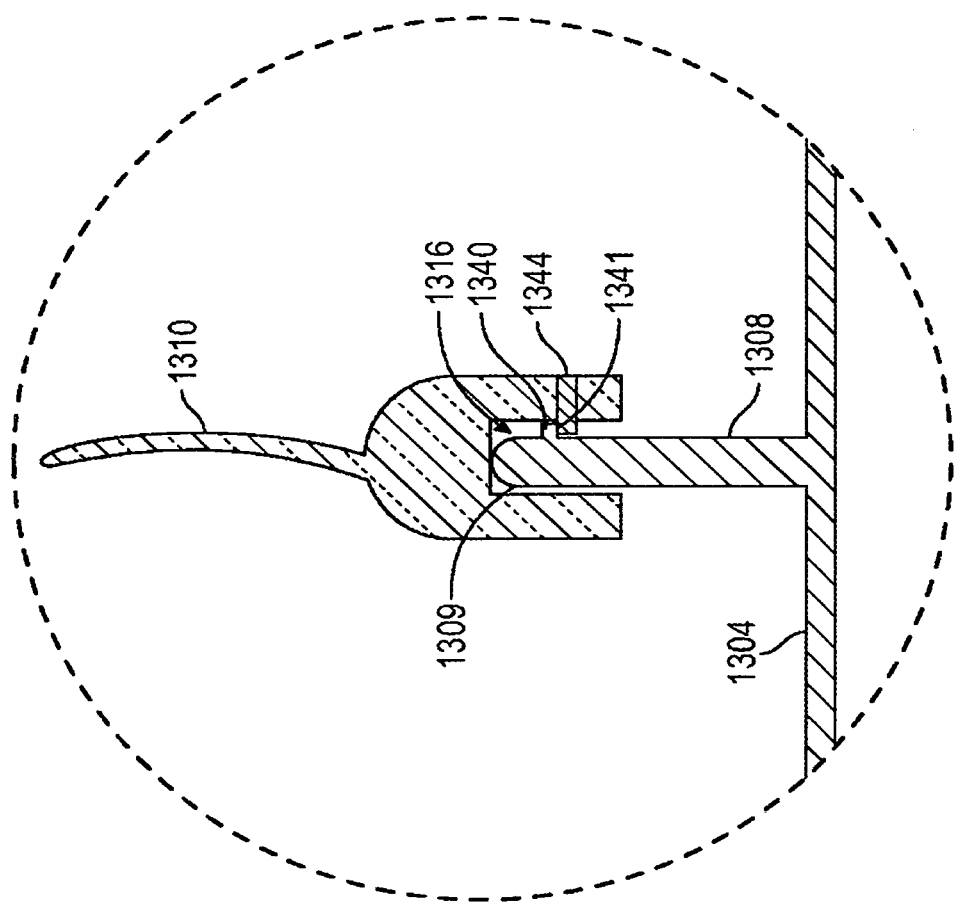
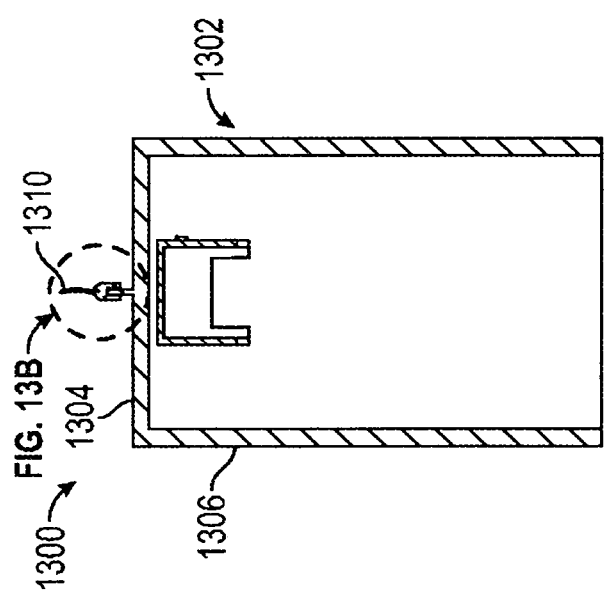
FIG. 13B
FIG. 13A

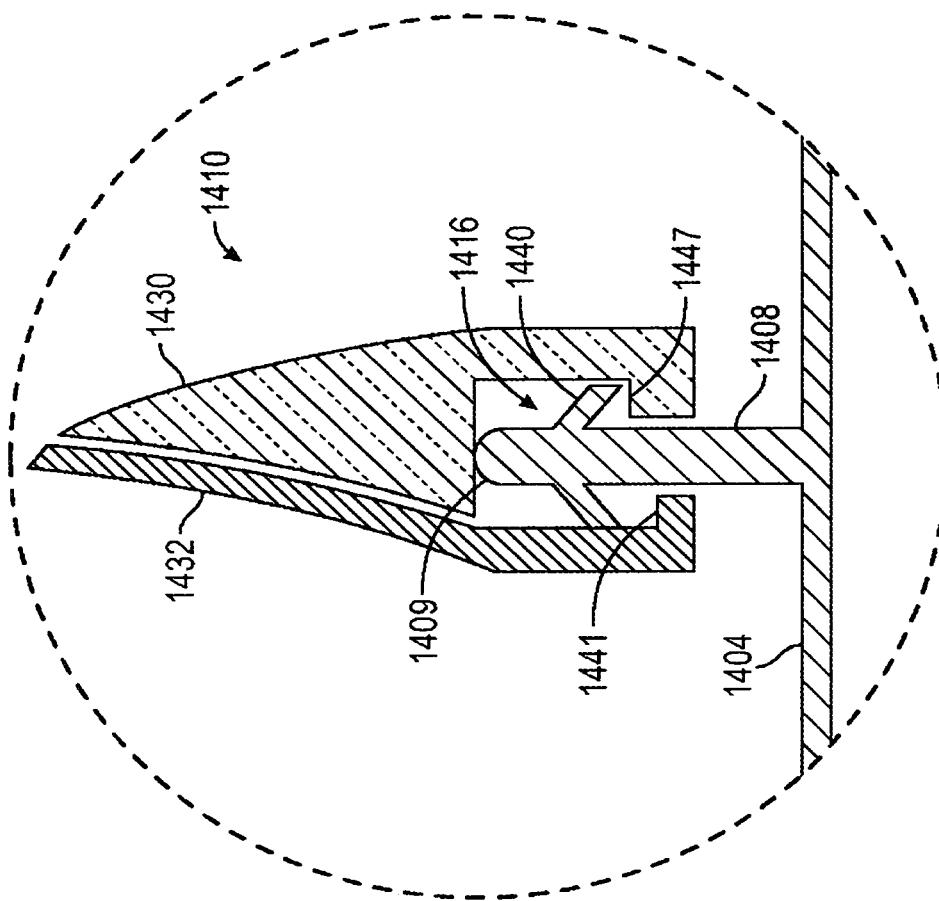
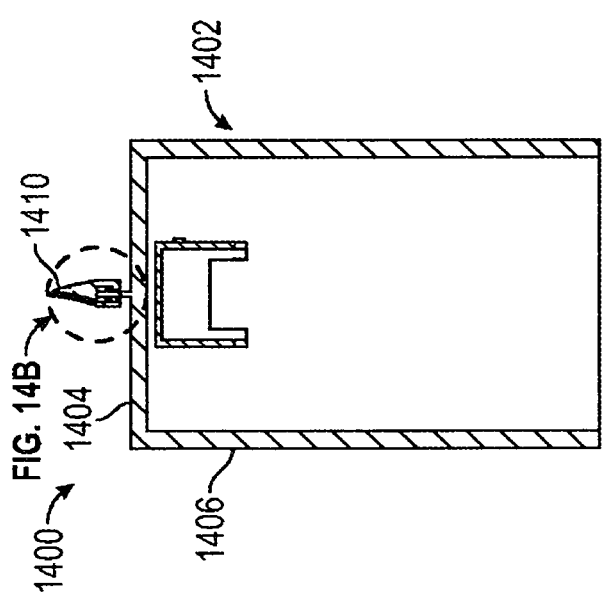
FIG. 14B
FIG. 14A

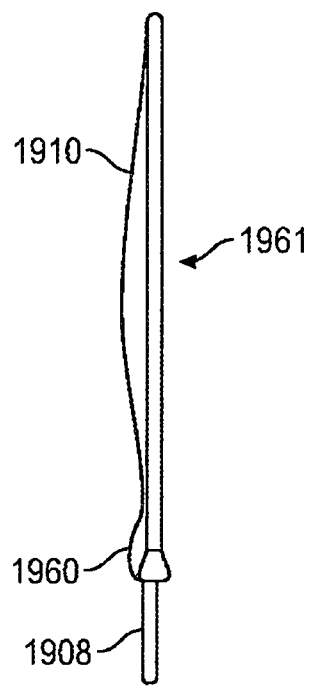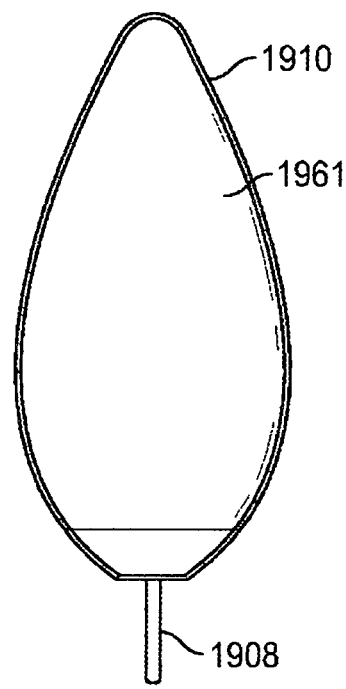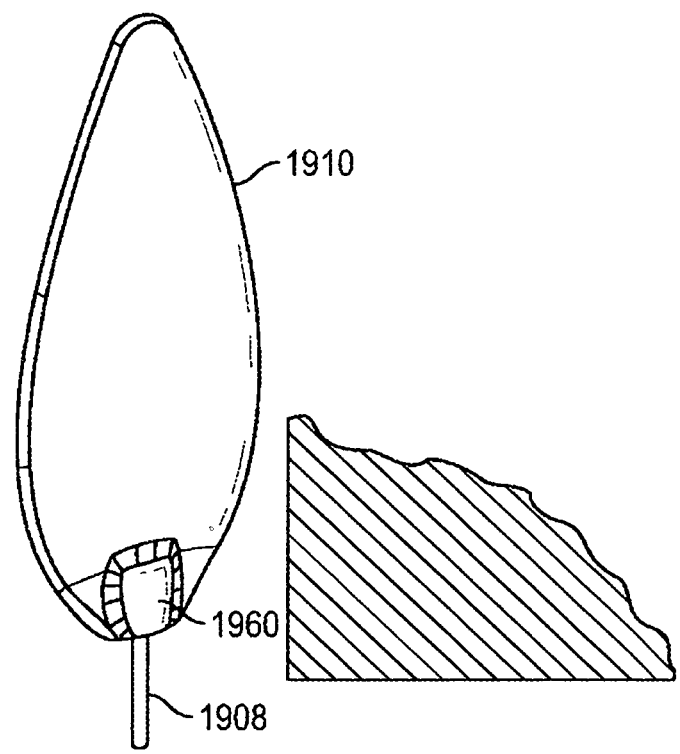
Side View
FIG. 19A
Front View
FIG. 19B
FIG. 19C

FIG. 20A  Cross Section

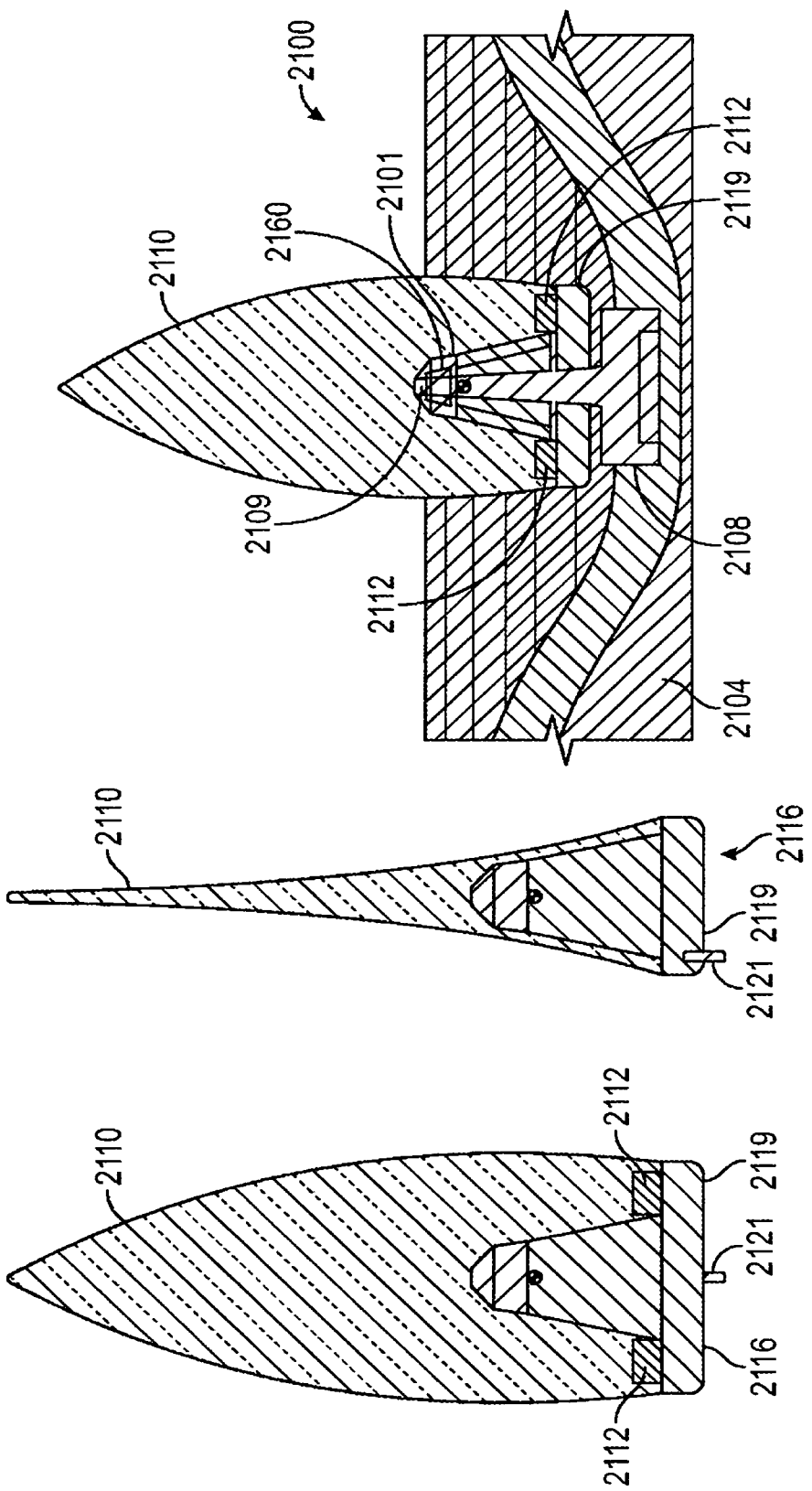

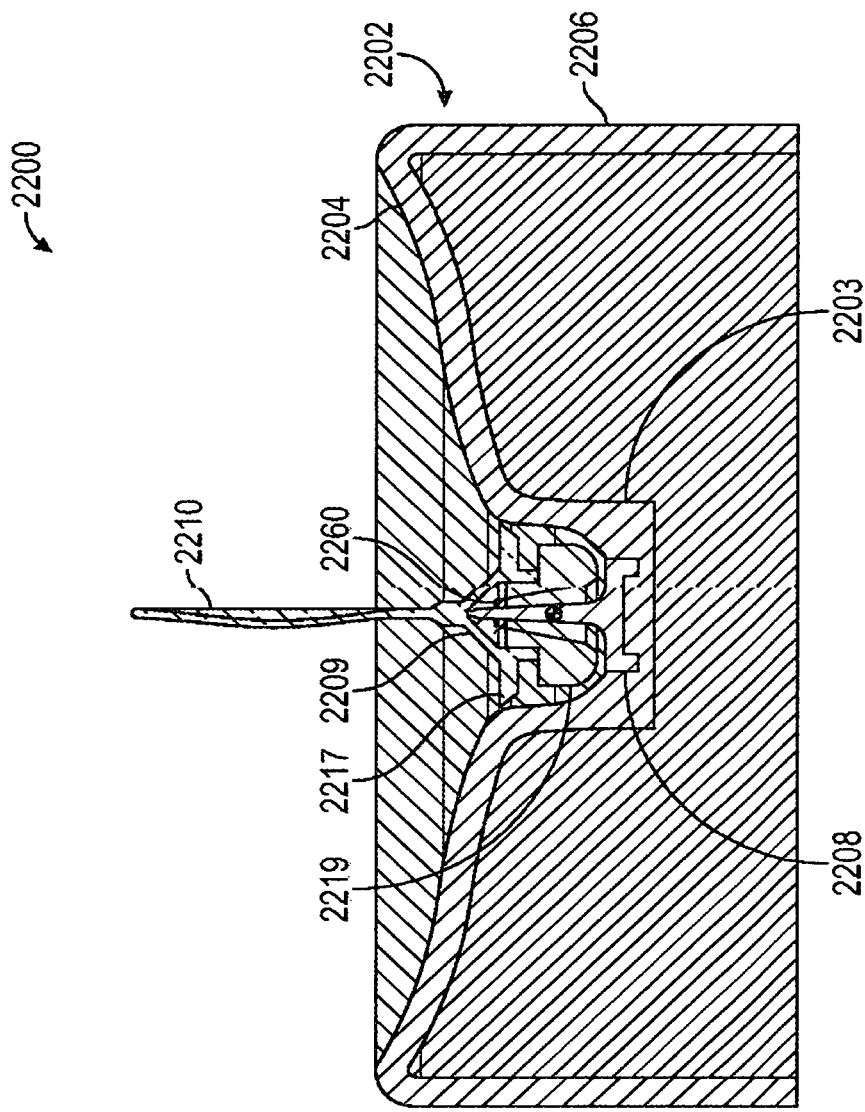
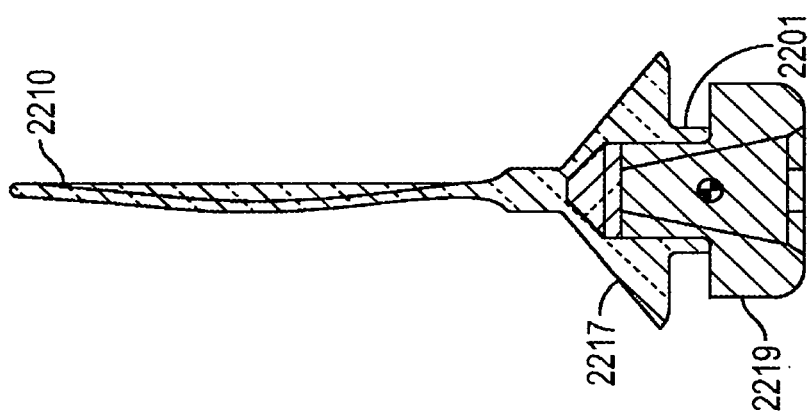
FIG. 22B
FIG. 22A

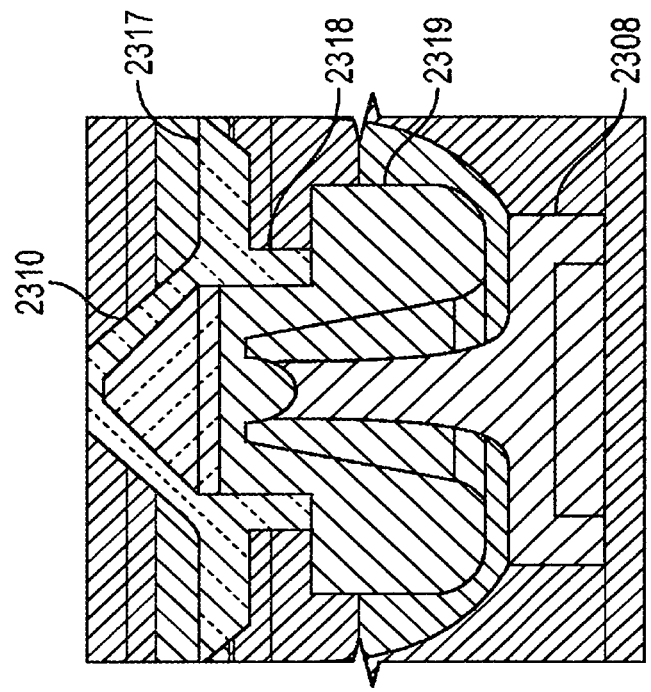
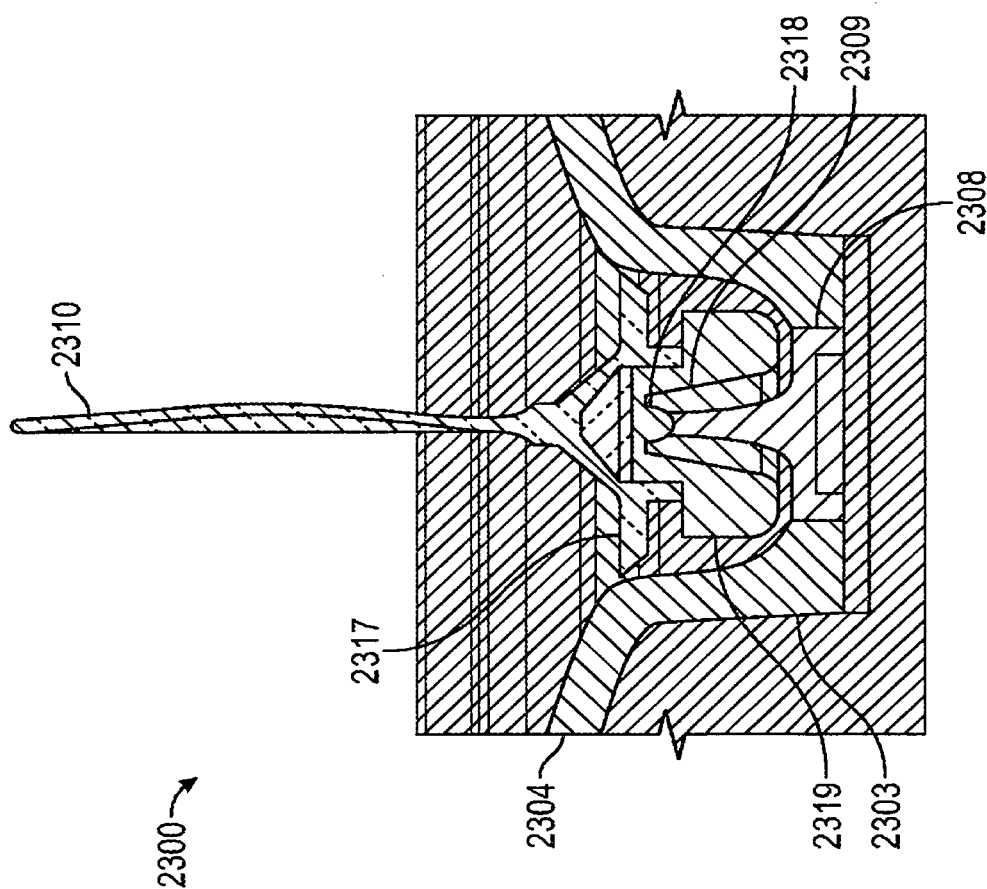

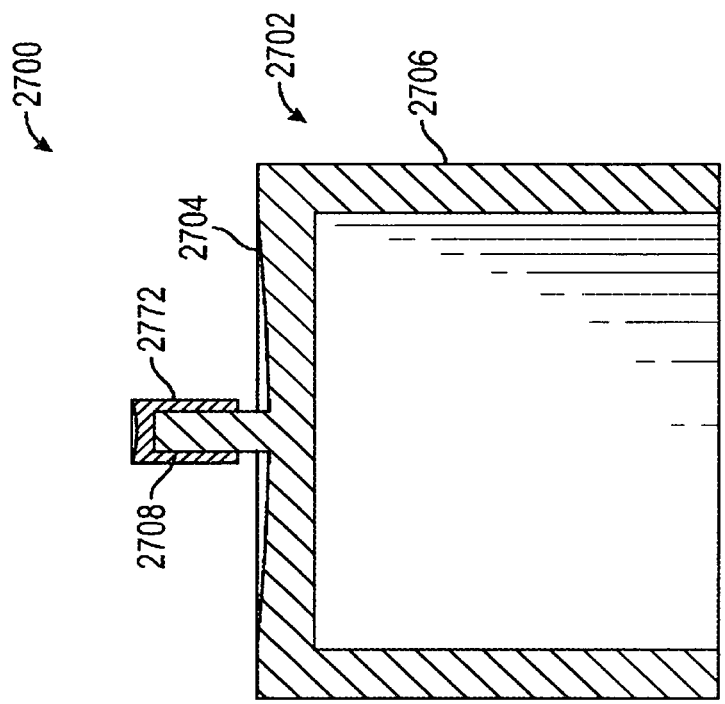
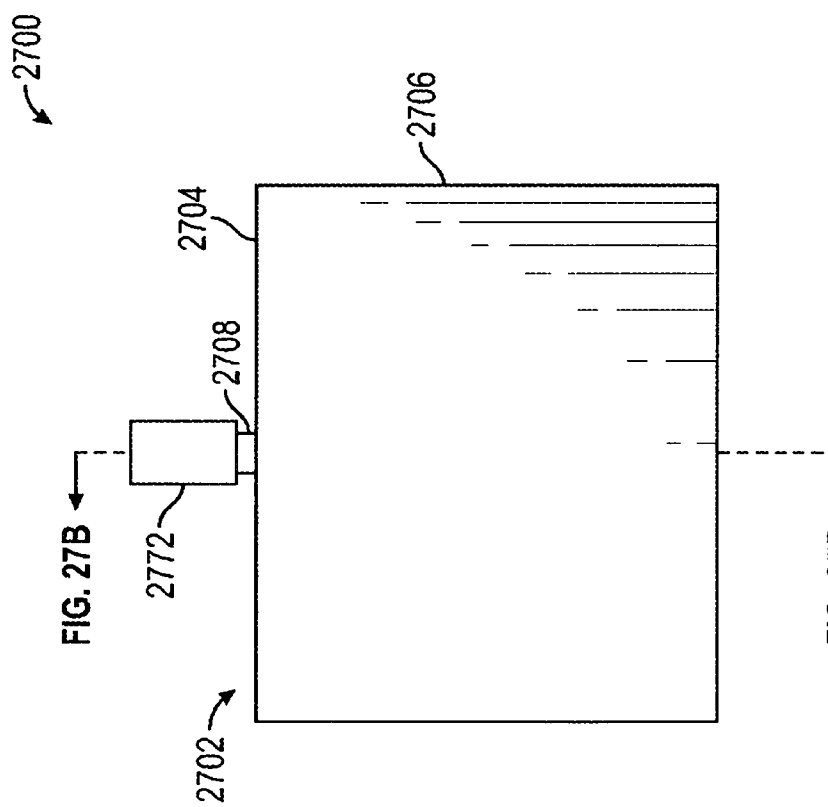
FIG. 27B
FIG. 27A

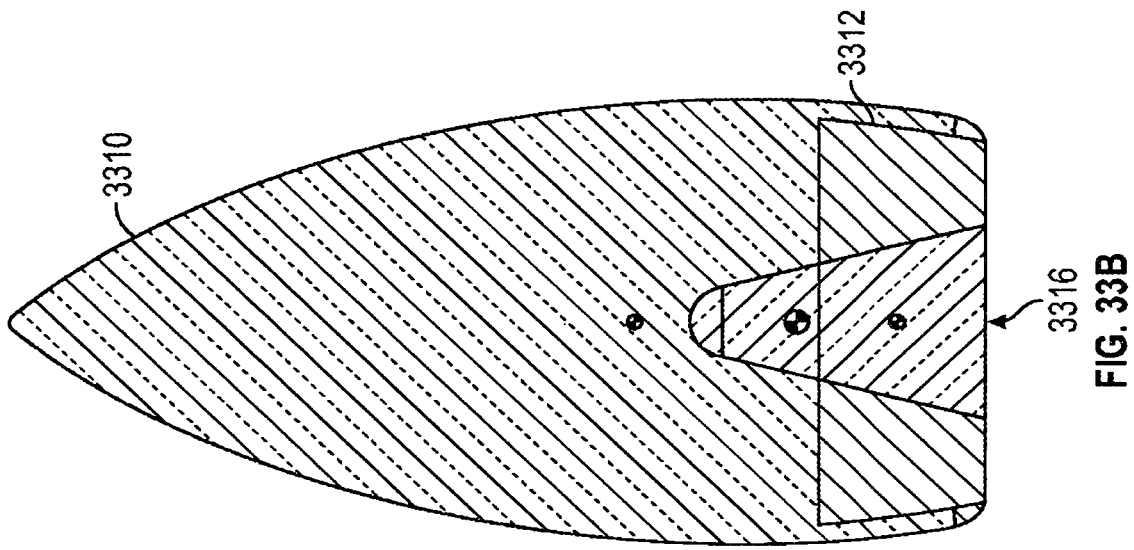
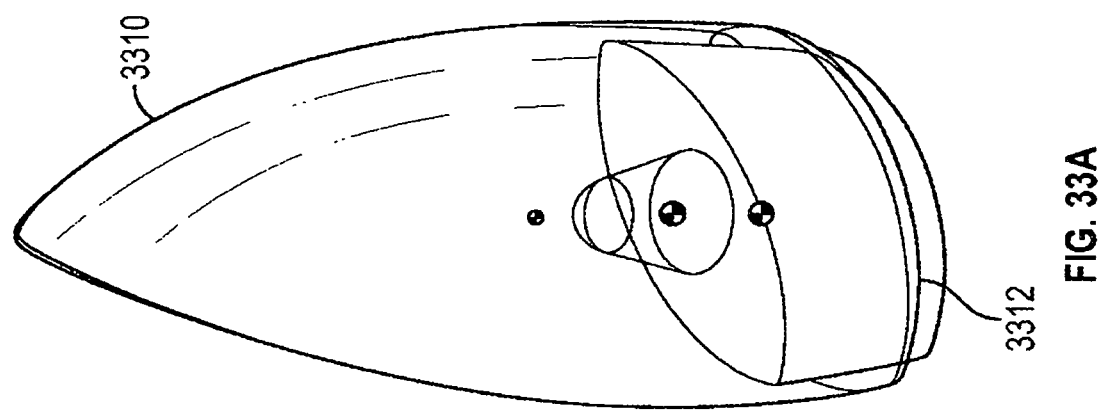

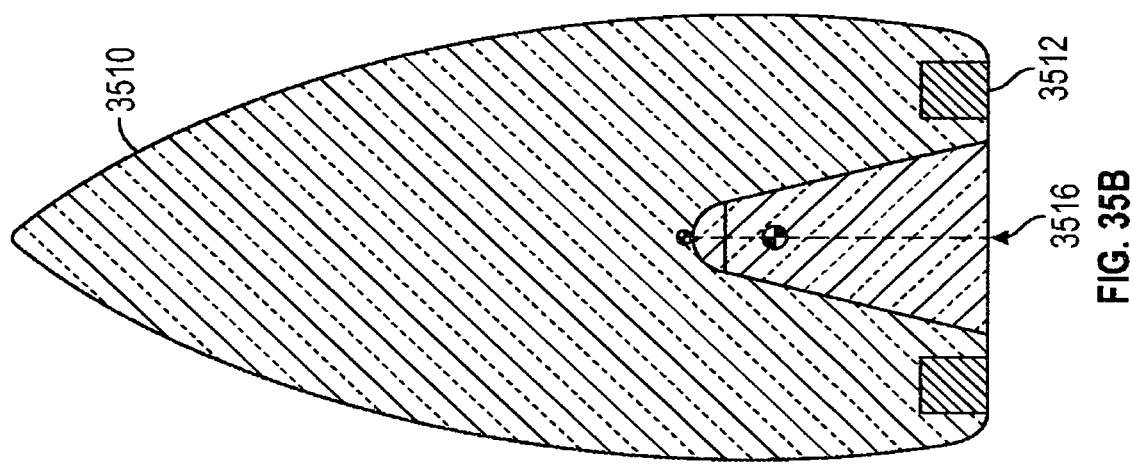
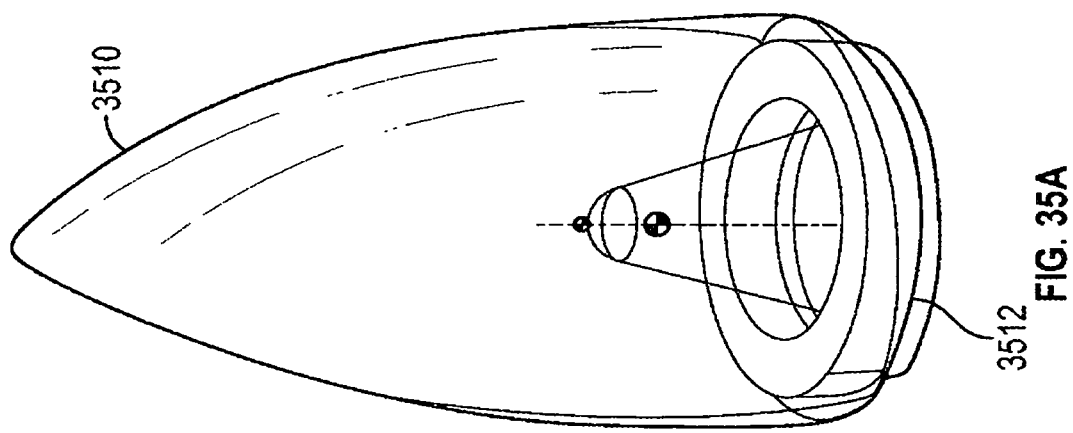

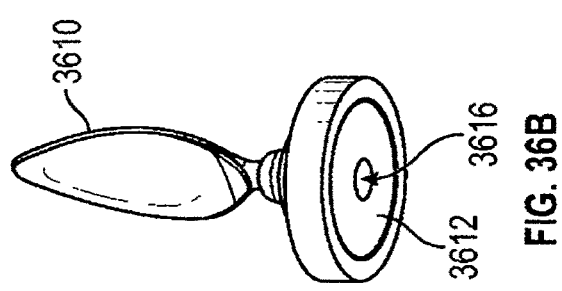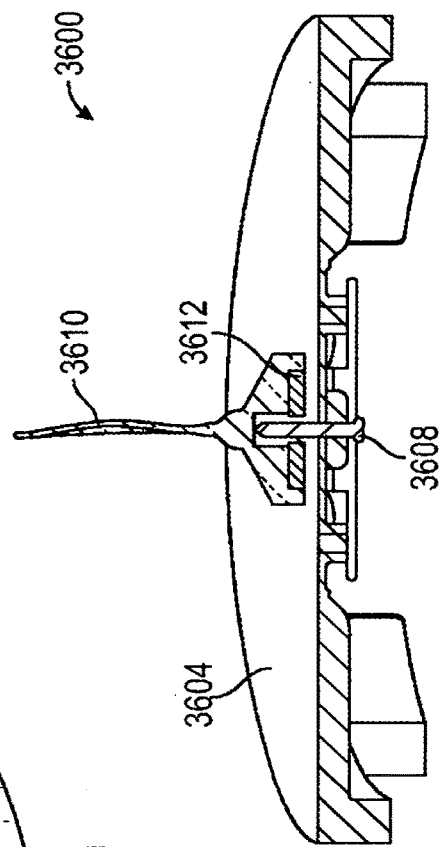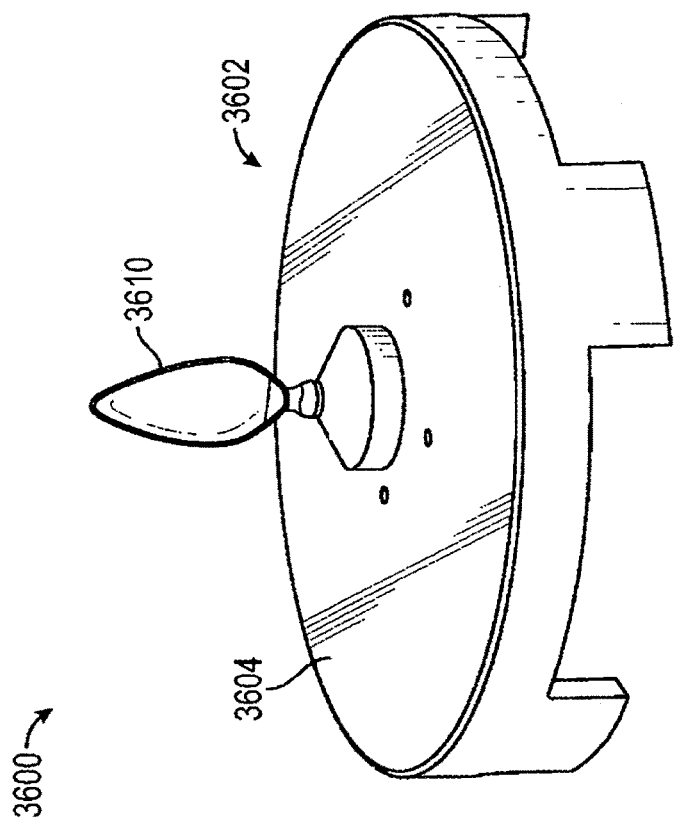

ELECTRIC LIGHTING DEVICE

This application claims priority to U.S. provisional application having Ser. No. 62/275,391 filed on Jan. 6, 2016, and also claims priority to U.S. provisional application having Ser. No. 62/367,366, filed on Jul. 27, 2016. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is electric lighting devices.

BACKGROUND

The following description includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al. U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., US 2011/0127914 to Patton et al., U.S. Pat. No. 7,350,720 to Jaworski et al.; US 2005/0285538 to Jaworski et al. (publ. December 2005); U.S. Pat. No. 7,481,571 to Bistritzky et al.; US 2008/0031784 to Bistritzky et al. (publ. February 2008); US 2006/0125420 to Boone et al. (publ. June 2006); US 2007/0127249 to Medley et al. (publ. June 2007); US 2008/0150453 to Medley et al. (publ. June 2008); US 2005/0169666 to Porchia, et al. (publ. August 2005); U.S. Pat. No. 7,503,668 to Porchia, et al.; U.S. Pat. No. 7,824,627 to Michaels, et al.; US 2006/0039835 to Nottingham et al. (publ. February 2006); US 2008/0038156 to Jaramillo (publ. February 2008); US 2008/0130266 to DeWitt et al. (publ. June 2008); US 2012/0024837 to Thompson (publ. February 2012); US 2011/0134628 to Pcstl et al. (publ. June 2011); US 2011/0027124 to Albec et al. (publ. February 2011); US 2012/0020052 to McCavit et al. (publ. January 2012); US 2012/0093491 to Browder et al. (publ. April 2012); and US 2014/0218903 to Sheng. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved electric candles and other lighting devices.

SUMMARY OF THE INVENTION

The inventive subject matter provides apparatus, systems and methods in which a flame element of an electric lighting device is disposed entirely outside of an enclosure and is mounted such that the flame element may move with respect to the enclosure. Among other advantages, this allows the hole in the enclosure's top surface to be smaller or eliminated entirely. In some embodiments, a separate aperture in the top surface may be needed for light to shine on to the flame element from a light source disposed within the enclosure.

Electric lighting devices of the inventive subject matter comprise a candle body having a drive mechanism and light source, a flame element, and support member for the flame element that is disposed outside of the candle body. In such embodiments, the flame element is able to move freely about a point where the flame element rests on or couples to the support member, which gives the appearance of a flickering flame when light shines on the flame-shaped portion of the flame element.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 5A-5B are a cross-section view and enlarged view, respectively, of another embodiment of an electric lighting device.

FIGS. 6A-6B are a cross-section view and enlarged view, respectively, of another embodiment of an electric lighting device.

FIGS. 7A-7B are a cross-section view and enlarged view, respectively, of another embodiment of an electric lighting device.

FIGS. 8A-8B are a cross-section view and enlarged view, respectively, of another embodiment of an electric lighting device.

FIGS. 9A-9B are a cross-section view and enlarged view, respectively, of another embodiment of an electric lighting device.

FIGS. 10A-10B are a cross-section view and enlarged view, respectively, of another embodiment of an electric lighting device.

FIGS. 11A-11B are a cross-section view and enlarged view, respectively, of another embodiment of an electric lighting device.

FIGS. 12A-12B are a cross-section view and enlarged view, respectively, of another embodiment of an electric lighting device.

FIGS. 13A-13B are a cross-section view and enlarged view, respectively, of another embodiment of an electric lighting device.

FIGS. 14A-14B are a cross-section view and enlarged view, respectively, of another embodiment of an electric lighting device.

FIGS. 19A-19C are a side view, a front view, and a back, perspective view, respectively of another embodiment of a flame element and support member.

FIGS. 20A-20C are a cross-section view, an enlarged view, and a schematic, respectively, of another embodiment of a flame element and support member.

FIGS. 21A-21C are various cross-section views of another embodiment of an electric lighting device.

FIGS. 22A-22B are cross-section views of another embodiment of an electric lighting device.

FIGS. 23A-23B are cross-section views of another embodiment of an electric lighting device.

FIGS. 27A-27B are a side view and cross-section view, respectively, of one embodiment of a housing and support member.

FIGS. 33A-33B are perspective and cross-section views of a schematic of one embodiment of a flame element.

FIGS. 35A-35B are perspective and cross-section views of a schematic of one embodiment of a flame element.

FIGS. 36A-36C are various views of another embodiment of an electric lighting device.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

This application describes a number of different embodiments of electric lighting devices comprising a housing that may be shaped like a pillar, taper, or other type of wax candle with a flame element mounted entirely outside of the candle body such that the flame element may move with respect to the housing and support member, while eliminating a hole in the top surface through which a flame element may extend that is found in prior art devices. Embodiments described in this application enable different manufacturing techniques to be employed to create the device and reduce the risk of liquid entering the device (such as by hermetically sealing the housing), while providing a realistic flame effect and desired level of functionality when the electric lighting device is assembled.

Figure 1:
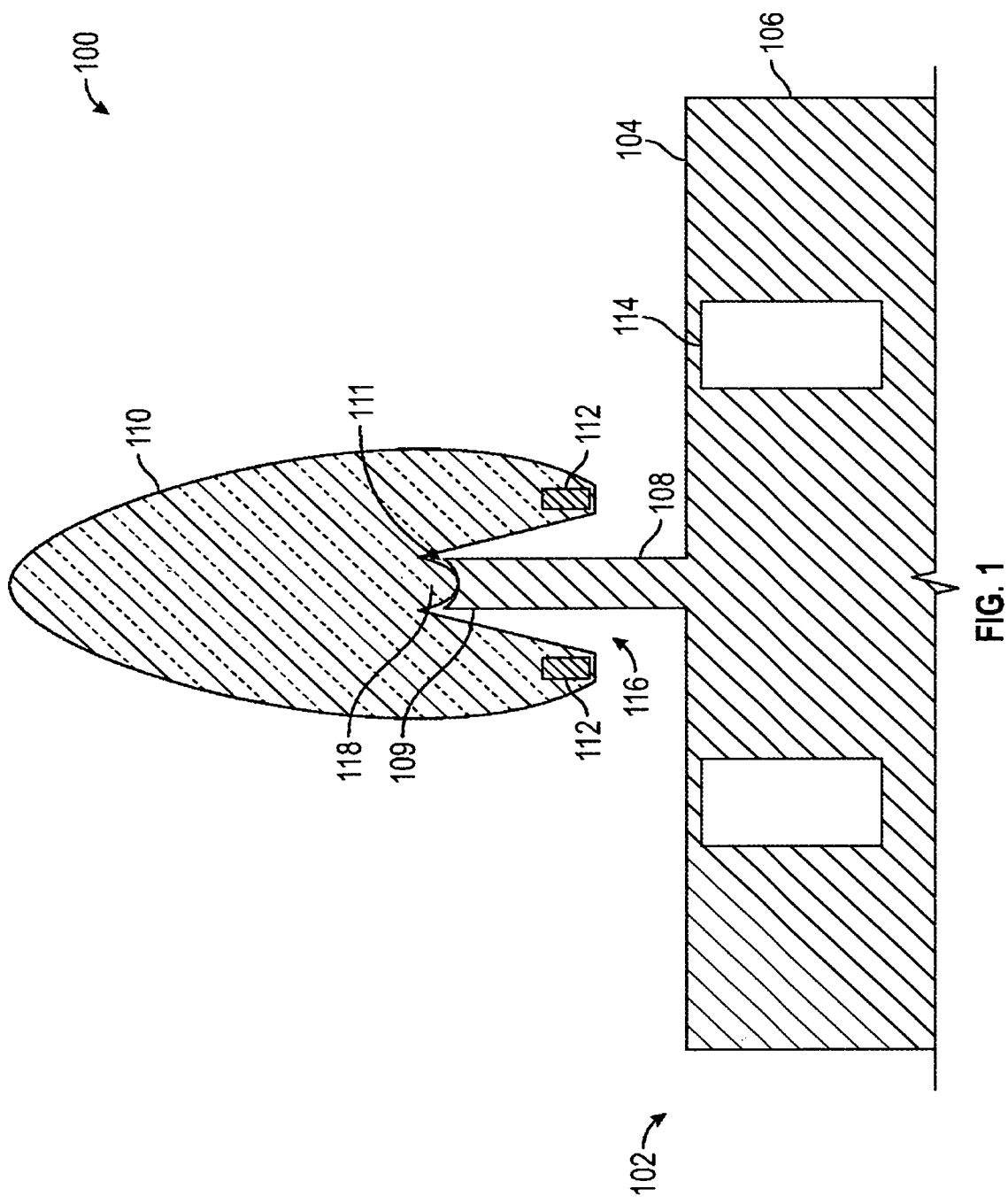
FIG. 1 is a cross-section view of one embodiment of an electric lighting device.
Figure 2:
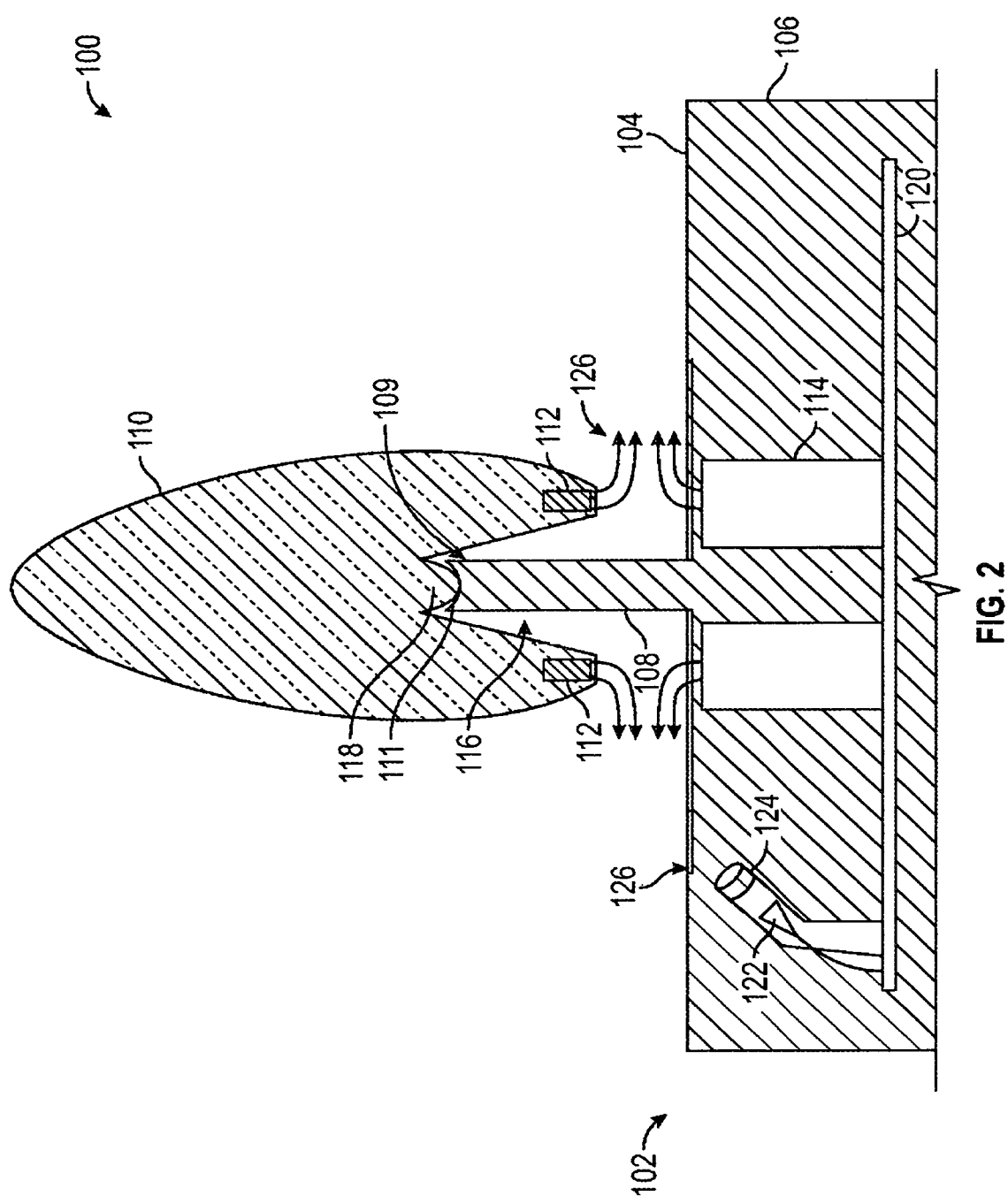
FIG. 2 is a cross-section view of another embodiment of an electric lighting device.

FIGS. 1-2 illustrates one embodiment of an electric lighting device 100 having an outer housing 102 with an upper surface 104 coupled to a sidewall 106. An elongated rod or support member 108 extends upwardly from the upper surface 104 of the device's outer housing 102, and terminates at a first end 109 disposed away from the upper surface 104. The device has a circuit board (PCB) disposed beneath the upper surface of the device's housing, with a battery compartment preferably disposed beneath the PCB. Although it is contemplated that the coil for an electromagnet can be disposed directly on the PCB, in other embodiments, the coil can be disposed on the support member.

Device 100 further includes a flame element 110 that is disposed entirely outside of the outer housing 102. The flame element 110 comprises one or more magnets 112 that are coupled to or embedded within the flame element 110. Preferably, the one or more magnets 112 are located within a lower portion of the flame element 110, as shown in FIG. 1. The one or more magnets 112 or other ferrous material may be coupled to, and is preferably embedded in the flame element 110. The one or more magnets can be placed anywhere on the flame element, but are preferably placed at the bottom portion.

In some contemplated embodiments, the flame element 110 comprises a hollow interior portion 116 and a projection 118 that extends into the hollow interior portion 116. In such embodiments, the projection 118 is preferably sized and dimensioned to rest within a recess, notch or depression 111 at the first end 109 of the support member 108. This advantageously allows the flame element 110 to rest on and be supported by the support member 108 while allowing for movement of the flame element 110 about the support member 108.

Device 100 can also include an electromagnet 114 that comprises a coil of wire and a signal generator to thereby create an electromagnetic field in the vicinity of the flame element 110 that interacts with the one or more magnets 112 and thereby causes movement of the flame element 110 about the support member 108. It is especially preferred that the electromagnet 114 is disposed on a circuit board and positioned within the housing 102 beneath the upper surface 104. In some contemplated embodiments, the coil forming the electromagnet 114 can be disposed beneath the upper surface 104 of the device's housing 102. In other contemplated embodiments, the coil can be disposed at the first end of the support member above the one or more magnets and within the flame element when the flame element is coupled to the support member.

As shown in FIG. 2, a light source 122 can be disposed within the outer housing 102, and configured to emit light upwardly through an aperture 126 in the upper surface 104 to thereby emit light on to the flame element 110. Preferably, the light source 122 and one or more lenses 124 are mounted to a circuit board 120, along with the electromagnet 114. The electromagnetic field 126 interacts with the one or more magnets 112 and thereby causes movement of the flame element 110. In contrast to FIG. 1, the coil 114 of FIG. 2 is placed directly under the diameter of the magnets 112. With respect to the remaining numerals in FIG. 2, the same considerations for like components with like numerals of FIG. 1 apply.

Figure 3:
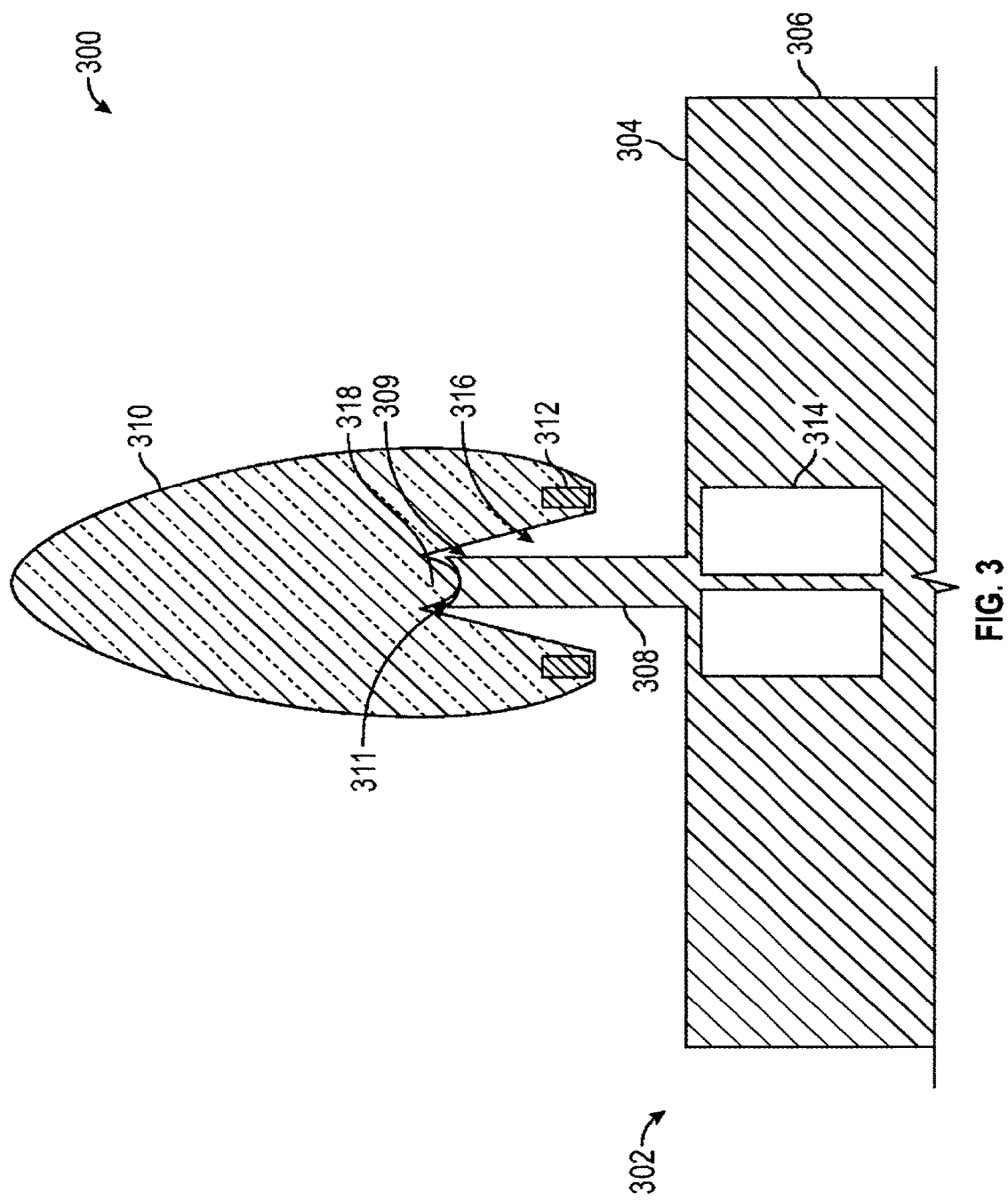
FIG. 3 is a cross-section view of another embodiment of an electric lighting device.
Figure 4:
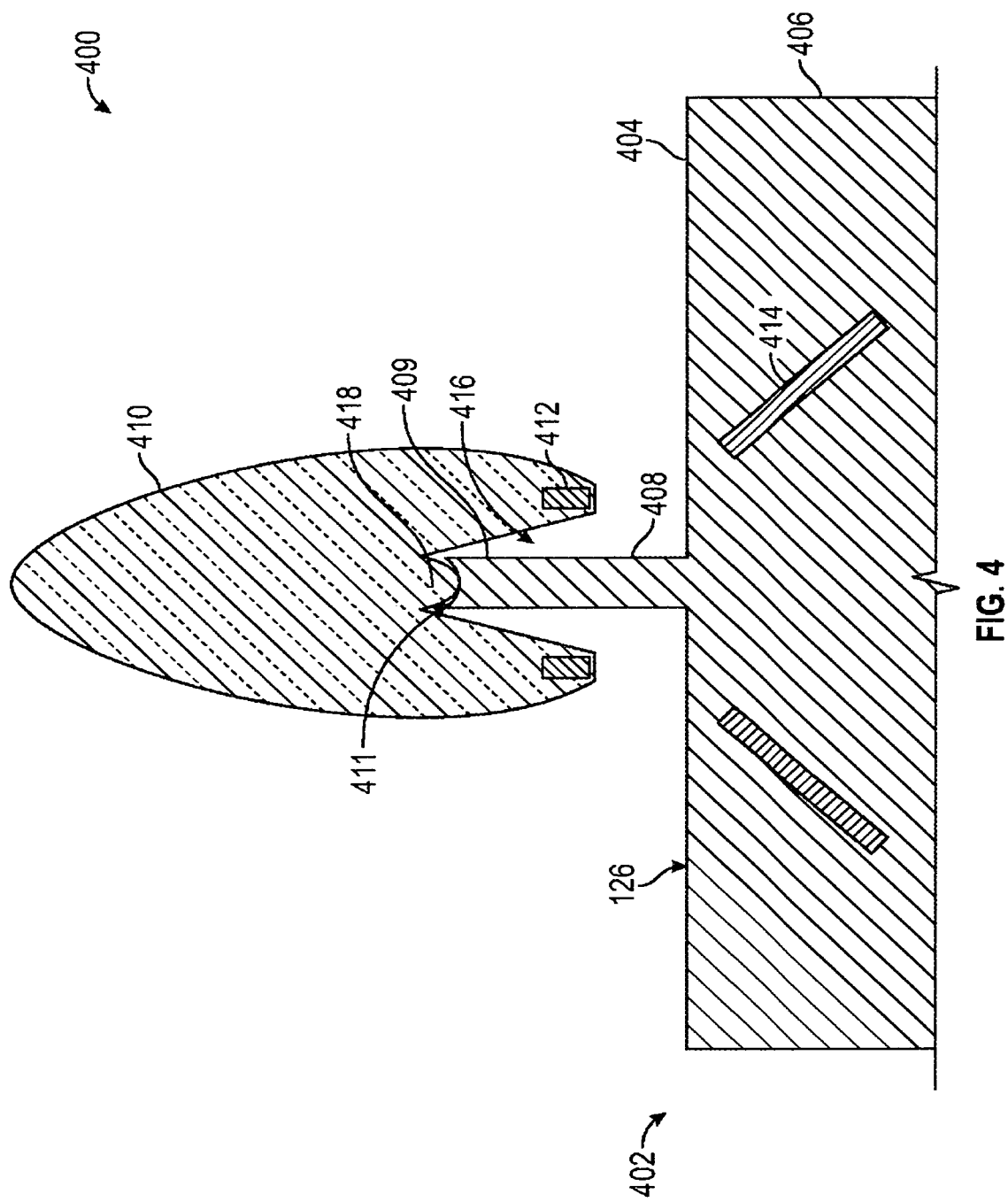
FIG. 4 is a cross-section view of another embodiment of an electric lighting device.

FIGS. 3-4 illustrate alternative embodiments of device 100. For example, in FIG. 3, device 300 comprises a coil of the electromagnet 314 having a smaller radius than the coil shown in FIGS. 1-2. FIG. 4 illustrates an alternative embodiment of device 400, in which the electromagnet 414 comprises angled coils. With respect to the remaining numerals in each of FIGS. 3 and 4, the same considerations for like components with like numerals of FIG. 1 apply.

FIGS. 5A-5B illustrate another embodiment of an electric lighting device 500, in which the flame element 510 has a pointed projection 518 configured to rest within a recessed area or indentation 511 of the first end 509 of the support member 508. With respect to the remaining numerals in each of FIGS. 5A-5B, the same considerations for like components with like numerals of FIG. 1 apply.

FIGS. 6A-6B illustrate another embodiment of an electric lighting device 600, in which the flame element 610 has a pointed projection 618 similar to FIGS. 5A-5B, while the recessed area or indentation 611 of the first end 609 of the support member 608 has a semi-circular shape. With respect to the remaining numerals in each of FIGS. 6A-6B, the same considerations for like components with like numerals of FIG. 1 apply.

FIGS. 7A-7B illustrate another embodiment of an electric lighting device 700, in which the first end 709 of the support member 708 has an upward projection and the hollow interior portion 716 of the flame element 710 has a flat upper portion at which the projection of the first end 709 contacts forming a pivot point. With respect to the remaining numerals in each of FIGS. 7A-7B, the same considerations for like components with like numerals of FIG. 1 apply.

FIGS. 8A-8B illustrate another embodiment of an electric lighting device 800, in which the first end 809 of the support member 808 also has an upward projection. In contrast to device 700, the hollow interior portion 816 of the flame element 810 has a curved upper portion defining a recessed area at which the projection of the first end 809 contacts to form a pivot point. With respect to the remaining numerals in each of FIGS. 8A-8B, the same considerations for like components with like numerals of FIG. 1 apply.

FIGS. 9A-9B illustrate another embodiment of an electric lighting device 900, in which the first end 909 of the support member 908 has a rounded projection and the hollow interior portion 916 of the flame element 910 has a flat upper portion at which the projection of the first end 909 contacts forming a pivot point. With respect to the remaining numerals in each of FIGS. 9A-9B, the same considerations for like components with like numerals of FIG. 1 apply.

Thus, as described above, the first end of the support member can have varying shapes that correspond with an upper portion of the hollow interior portion of the flame element to thereby form a pivot point about which the flame element can rotate. The embodiments shown in FIGS. 1 and 2, for example, can therefore be modified with one or more of the components illustrated in FIGS. 5A-9B without departing from the scope of invention.

As shown in FIGS. 10A-10B, the support member 1008 can further include one or more arms or projections 1040 that are flexible in a first direction but not in a second direction opposite that of the first direction. For example, as shown in FIG. 10B, the projections 1040 are flexible in a first direction that is downward and toward the support member 1008. In this manner, the support member 1008 and its projection(s) 1040 can be inserted into the hollow interior portion 1016 of the flame element 1010. As the projections 1040 are inserted into the narrower mouth of the hollow portion 1016, the projections 1040 are caused to fold inwardly toward the support member 1008. Once the support member 1008 is fully inserted into the hollow interior portion 1016, the projection(s) 1040 unfold as shown in FIG. 10B. This helps prevent unintentional or undesired removal of the flame element 1010 from the support member 1008, as an attempt to pull the flame element 1010 from the support member 1008 will be prevented by the projection(s) 1040.

As shown in FIG. 10B, the hollow interior portion 1016 can have a varying diameter that is narrower at the mouth or outlet at the bottom of the flame element 1010, and wider toward the middle or central area of the flame element 1010. While the diameter could have a taper, it is preferred that there is an abrupt change in diameter 1041 from narrow to wide along the height of the flame element 1010 to help prevent removal of the flame element 1010 from the support member 1008. With respect to the remaining numerals in each of FIGS. 10A-10B, the same considerations for like components with like numerals of FIG. 1 apply.

FIGS. 11A-11B illustrate another embodiment of a device 1100, in which the support member 1108 includes one or more arms or projections 1140. Contrary to the flame element. 1010 in FIGS. 10A-10B, flame element 1110 comprises a hollow interior portion 1116 with a constant diameter when manufactured. To vary the diameter of the hollow interior portion 1116, a plug or insert 1142 is inserted into the hollow interior portion 1116 after manufacture. In some contemplated embodiments, the plug 1142 can include one or more magnets and be composed of a plastic or other non-ferrous material. However, it is also contemplated that the plug itself could be ferrous eliminating the need for separate magnets. Finally, when choosing the material for plug 1142, a heavier weight material could be used to lower the center of gravity of the flame element 1110 to below that of the pivot point for example.

Similar to that shown in FIGS. 10A-10B, support member 1108 can further include one or more arms or projections 1140 that are flexible in a first direction but not in a second direction opposite that of the first direction. For example, as shown in FIG. 11B, the projections 1140 are flexible in a first direction that is downward and toward the support member 1108. In this manner, the support member 1108 and its projection(s) 1140 can be inserted into the hollow interior portion 1116 of the flame element 1110. As the projections 1140 are inserted into the narrower mouth defined by plug 1142, the projections 1140 are caused to fold inwardly toward the support member 1108. Once the support member 1108 is fully inserted into the hollow interior portion 1116, the projection(s) 1140 unfold as shown in FIG. 11B. This helps prevent unintentional or undesired removal of the flame element 1110 from the support member 1108, as an attempt to pull the flame element 1110 from the support member 1108 will be prevented by the projection(s) 1140 and upper surface 1141 of plug 1142. With respect to the remaining numerals in each of FIGS. 11A-11B, the same considerations for like components with like numerals of FIG. 1 apply.

FIGS. 12A-12B illustrate another embodiment of a device 1200 similar to that shown in FIGS. 11A-11B, except that the plug 1242 has a tapered upper surface 1241. As discussed above, plug 1242 could be configured to receive one or more magnets and be composed of a plastic or other non-ferrous material. However, it is also contemplated that the plug itself could comprise a ferrous material eliminating the need for separate magnets. Finally, when choosing the material for plug 1242, a heavier weight material could be used to lower the center of gravity of the flame element 1210 to below that of the pivot point for example. With respect to the remaining numerals in each of FIGS. 12A-12B, the same considerations for like components with like numerals of FIGS. 1 and 12B apply.

FIGS. 13A-13B illustrate another embodiment of a device 1300, in which the support member 1308 includes one or more arms or projections 1340. Contrary to the flame element 1010 in FIGS. 10A-10B, flame element 1310 comprises a hollow interior portion 1316 with a constant diameter when manufactured, although a taper diameter or other varying diameter could be used. To help prevent removal of the flame element 1310 from the support member 1308, a pin 1344 can be inserted or pressed through the flame element 1310 that interacts with projection 1340 to prevent flame element 1310 from falling from or otherwise be removed from the support member 1308. It is contemplated that the pin 1344 could be molded with the flame element 1310 at manufacture or inserted after the fact.

Where the pin 1344 is inserted prior to the flame element 1310 being inserted on to the support member 1310, it is contemplated that the one or more arms or projections 1340 are flexible only in one direction to flex when the flame element is being inserted on to the support member 1308, but inhibit the flame element 1310 being removed from the support member 1308 due to the overlap between the projection 1340 and the upper surface 1341 of pin 1344. It is also contemplated that the pin 1344 could be inserted into the flame element 1310 after the flame element 1310 is positioned on the support member 1308. In such embodiments, the projection 1340 could be rigid. With respect to the remaining numerals in each of FIGS. 13A-13B, the same considerations for like components with like numerals of FIG. 1 apply.

FIGS. 14A-14B illustrate another embodiment of a device 1400, in which the flame element 1410 comprises a first piece 1430 and a second piece 1432 that couple together to form the flame element 1410. It is contemplated that the pieces could be secured to one another by any commercially suitable fastener including for example a glue or other adhesive, a snap fit, and so forth. One or both of pieces 1430, 1432 could be configured to receive a magnet or, alternatively, comprise a ferrous material in at least a portion of the piece.

Device 1400 further includes a support member 1408 having one or more arms or projections 1440 that extend outwardly from the support member 1408. The slant or tilt of the projections 1440 relative to the support member 1408 will partly depend on the desired range of movement of the flame element 1410. Preferably, the first and second pieces 1430, 1432 are coupled to one another about the support member 1408 to thereby secure the flame element 1410 to the support member 1408. Once secured about the support member 1408, removal of the flame element is inhibited due to the overlap of the projection(s) 1440 with the upper surface 1447 of the first piece and the upper surface 1441 of the second piece. In addition, the projection(s) 1440 are preferably configured either to be rigid, or to only flex in a first direction that is toward the support member 1408, such as described above. With respect to the remaining numerals in each of FIGS. 14A-14B, the same considerations for like components with like numerals of FIG. 1 apply.

Figure 15A:
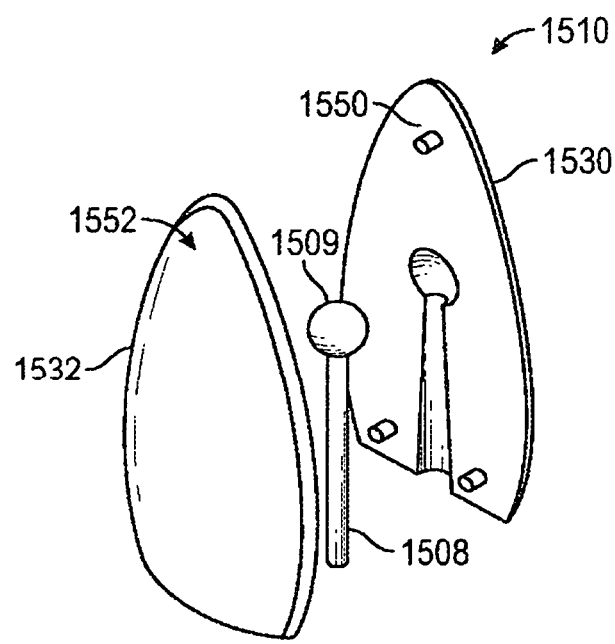
FIGS. 15A-15B are an exploded view and perspective view, respectively of one embodiment of a flame element and support member.

Similar to FIGS. 14A-14B, FIGS. 15A-15B illustrate another embodiment of a device 1500 having a flame element defined by a first piece 1530 and a second piece 1532 that couple to one another. As shown in FIG. 15A, the first piece 1530 can include one or more projections 1550 and preferably at least two projections, while the second piece 1532 can include a similar number of indentations 1552 that are sized and dimensioned to each receive a projection 1550. In some embodiments, the projections 1550 can simply be friction fit into the indentations 1552, while in other embodiments, an adhesive or other fastener could be used to secure the first and second pieces 1530, 1532 together.

Figure 15B:
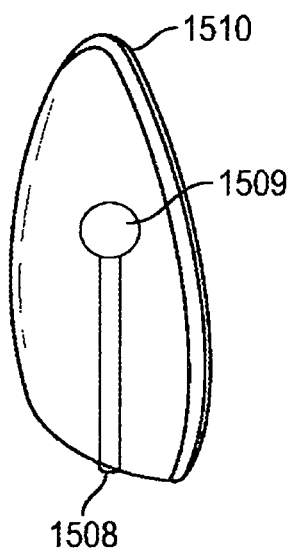

Preferably, the pieces 1530, 1532 are secured together about the support member 1508 to prevent removal of the flame element 1510 from the support member 1508 without first separating the first and second pieces 1530, 1532. As shown in FIGS. 15A-15B, the support member 1508 can have a first end 1509 having a spherical surface that corresponds with a spherical interior portion 1516 of the flame element 1510. This advantageously allows the flame element 1510 to rotate about the first end 1509 with the rotation limited when the lower portion of the flame element 1510 contacts the support member 1508. With respect to the remaining numerals in each of FIGS. 15A-15B, the same considerations for like components with like numerals of FIG. 1 apply.

Figure 16A:
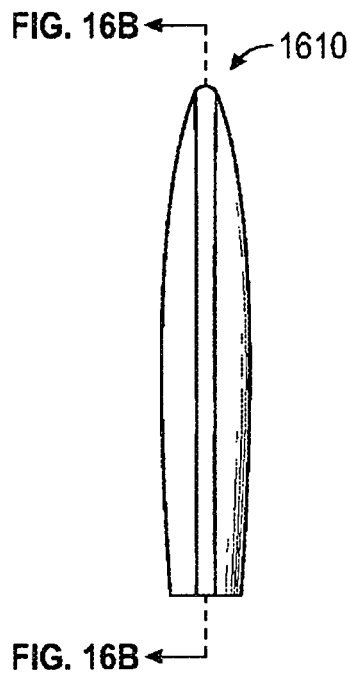
FIGS. 16A-16C are a side view, a cross-section view and a perspective view, respectively, of another embodiment of a flame element.
Figure 16B:
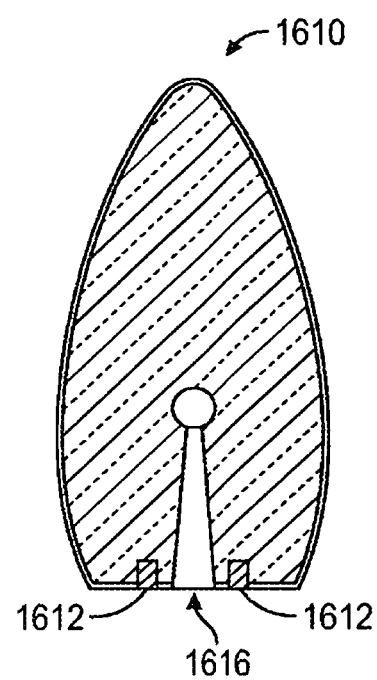
Figure 16C:
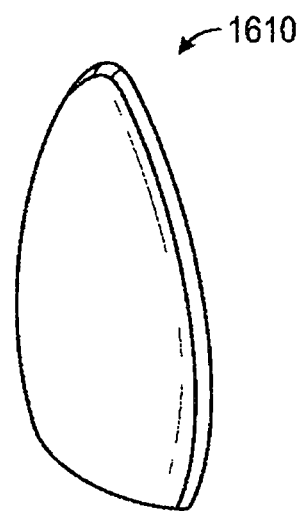

FIGS. 16A-16C illustrate a flame element 1610 similar to that shown in FIGS. 15A-15B, where the flame element 1610 comprises magnets 1612 at a lower portion. With respect to the remaining numerals in each of FIGS. 16A-16C, the same considerations for like components with like numerals of FIG. 1 apply.

Figure 17A:
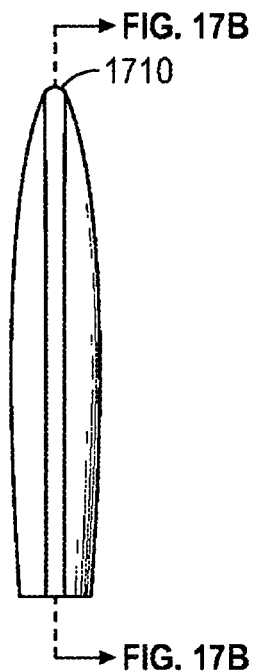
FIGS. 17A-17C are a side view, a cross-section view and a perspective view, respectively, of another embodiment of a flame element.
Figure 17B:
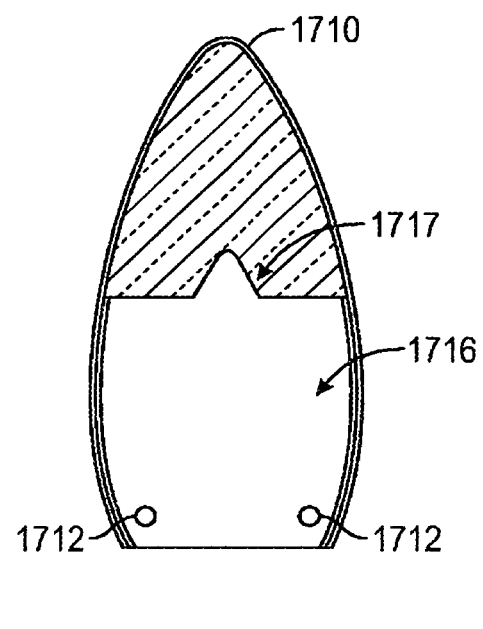
Figure 17C:
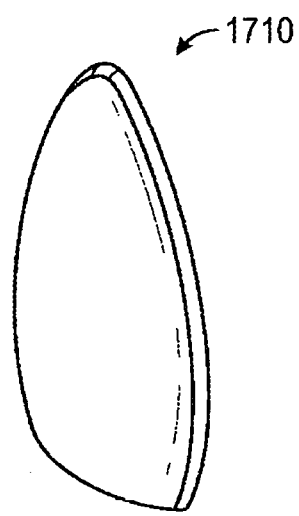

FIGS. 17A-17C illustrate another embodiment of a flame element 1710 having a hollow interior portion 1716 with its upper portion having a recessed area or indentation 1717 where a first end of a support member can rest to form a pivot point for the flame element 1710. With respect to the remaining numerals in each of FIGS. 17A-17C, the same considerations for like components with like numerals of FIG. 1 apply.

Figure 18A:
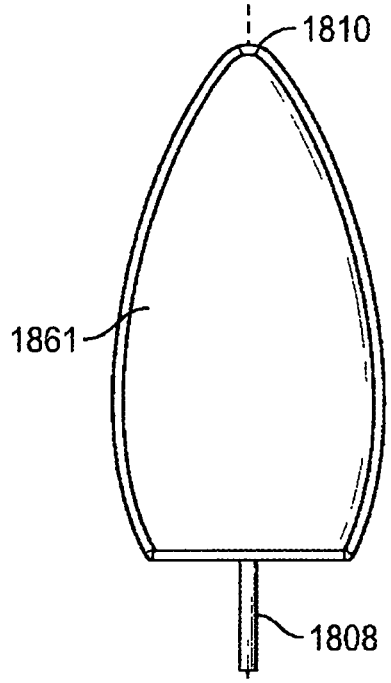
FIGS. 18A-18C are a front view, a cross-section view, and a back, perspective view, respectively of another embodiment of a flame element and support member.
Figure 18B:
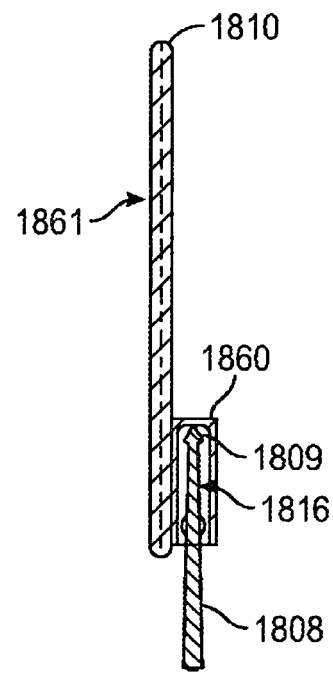
Figure 18C:
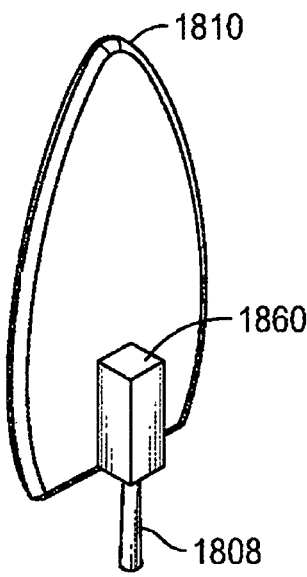

FIGS. 18A-18C illustrate another embodiment of a flame element 1810 having a hollow interior portion 1816 disposed on a backside of the flame element 1810 that is opposite the side that defines the face 1861 of the flame element 1810 on to which light is emitted. The hollow interior portion is defined by a pocket 1860 that can be integral with the flame element 1810 (e.g., molded during manufacture of the flame element) or separately attached. Because the pocket 1860 is located on a backside of the flame element 1810, it is generally hidden from view when the lighting device is viewed from the front. With respect to the remaining numerals in each of FIGS. 18A-18C, the same considerations for like components with like numerals of FIG. 1 apply.

FIGS. 19A-19C illustrate another embodiment of a flame element 1910 having a hollow interior portion 1916 disposed on a backside of the flame element 1910 that is opposite the side that defines the face 1961 of the flame element 1910 on to which light is emitted. The hollow interior portion is defined by a pocket 1960 that can be integral with the flame element 1910 (e.g., molded during manufacture of the flame element) or separately attached. Because the pocket 1960 is located on a backside of the flame element 1910, it is generally hidden from view when the lighting device is viewed from the front. With respect to the remaining numerals in each of FIGS. 19A-19C, the same considerations for like components with like numerals of FIG. 1 apply.

Figure 20B:
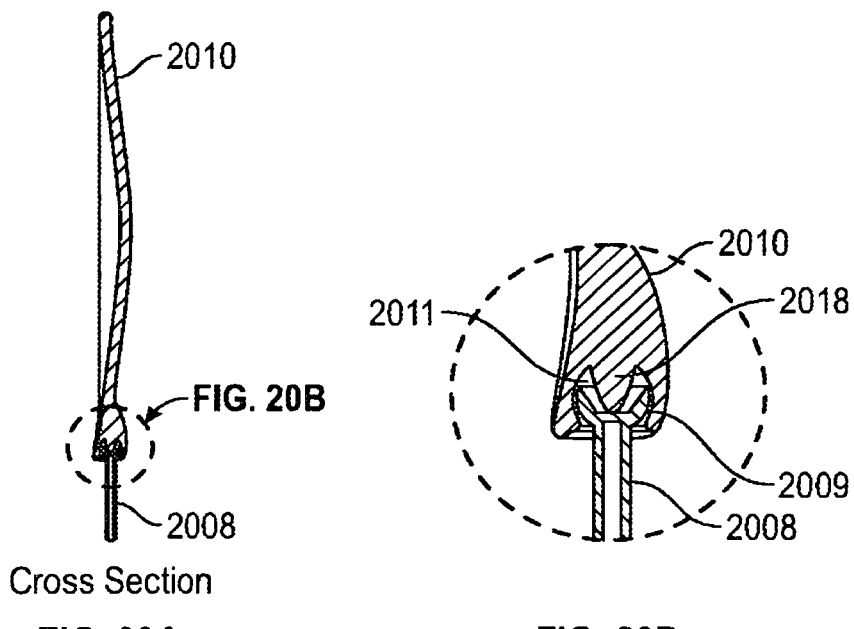
Figure 20C:
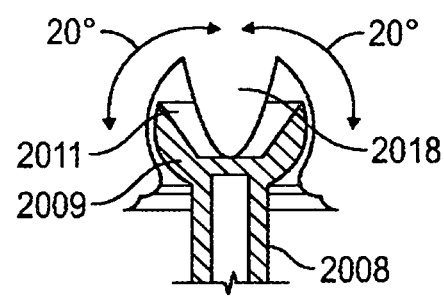

FIGS. 20A-20C illustrate another embodiment of a flame element 2010 having a hollow interior portion 2016 in its lower portion with a projection 2018 extending downwardly from the roof or upper surface of the interior portion 2016. The projection is preferably configured to rest within a recessed area or indentation 2011 of a first end 2009 of a support member 2008. As shown in FIG. 20C, the relative configuration of the projection 2018 and indentation 2011 allow for up to 20 degree movement of the flame element from a fully uptight position. Because of the spherical nature of the projection 2018 and first end 2009, the flame element can pivot 360 degrees about the first end 2009. With respect to the remaining numerals in each of FIGS. 20A-20C, the same considerations for like components with like numerals of FIG. 1 apply.

FIGS. 21A-21C illustrate another embodiment of an electric lighting device 2100 having an outer housing with an upper surface 2104. A support member 2108 extends upwardly from the upper surface 2104, and preferably originates from a recessed area or valley of the upper surface 2104. The support member 2108 is preferably embedded or molded into the upper surface 2104 during manufacture of the housing but can otherwise be coupled to the upper surface 2104.

The support member 2108 can further include a ring that is preferably clipped on or otherwise attached to the support member 2108 to secure the flame element 2110 to the support member 2108.

Flame element 2110 can further include a weight 2119 coupled to the bottom portion of the flame element 2110 that advantageously lowers the center of gravity 2101 of the flame element 2110 to below the pivot point. It is contemplated that the weight 2119 can be molded or embedded into the flame element 2110 during manufacture or coupled to the flame element 2110 afterwards. Where the weight 2119 is coupled to the flame element 2110 after manufacture, it is contemplated that the weight 2119 could be first inserted on the support member 2108, followed by the ring 2160, then the flame element 2110, after which the flame element 2110 and weight 2119 can be coupled to one another. Flame element 2110 or weight 2119 can include a projection 2121 to limit movement of the flame element 2110 about the support member 2108. With respect to the remaining numerals in each of FIGS. 21A-21C, the same considerations for like components with like numerals of FIG. 1 apply.

FIGS. 22A-22B illustrate another embodiment of an electric lighting device 2200 having an outer housing with an upper surface 2204. A support member 2208 extends upwardly from the upper surface 2204, and preferably originates from a recessed area or valley 2203 of the upper surface 2204. The support member 2208 is preferably embedded or molded into the upper surface 2204 during manufacture of the housing but can otherwise be coupled to the upper surface 2204.

Device has a flame element 2210 having a tapered lower portion that forms a rim 2217 extending horizontally from the lower portion, such that the run 2217 is disposed within the valley 2233. The rim 2217 advantageously covers the weight 2219 and support member 2208, such that neither can be viewed when the flame element 2210 is coupled to the support member 2208. Preferably, a color of the rim 2217 is chosen to match or closely match a color of the upper surface 2204, such that the upper surface 2204 may appear contiguous with the rim 2217 when viewed from a distance.

Flame element 2210 can further include a weight 2219 coupled to the bottom portion of the flame element 2210 that advantageously lowers the center of gravity 2201 of the flame element 2210 to below the pivot point. It is contemplated that the weight 2219 can be molded or embedded into the flame element 2210 during manufacture or coupled to the flame element 2210 afterwards. Where the weight 2219 is coupled to the flame element 2210 after manufacture, it is contemplated that the weight 2219 could be first inserted on the support member 2208, followed by the ring 2260 then the flame element 2210, after which the flame element 2210 and weight 2219 can be coupled to one another.

The support member 2208 can further include a ring that is preferably clipped on or otherwise attached to the support member 2208 to secure the flame element 2210 to the support member 2208. With respect to the remaining numerals in each of FIGS. 22A-22B, the same considerations for like components with like numerals of FIG. 1 apply.

FIGS. 23A-23B illustrate another embodiment of an electric lighting device 2300 similar to that shown in FIGS. 22A-22B, except that the weight 2319 comprises a downward projection 2318 that is configured to rest within a recessed area or indentation of the first end 2309 of the support member 2308. With respect to the remaining numerals in each of FIGS. 23A-23B, the same considerations for like components with like numerals of FIGS. 22A-22B apply.

Figure 24A:
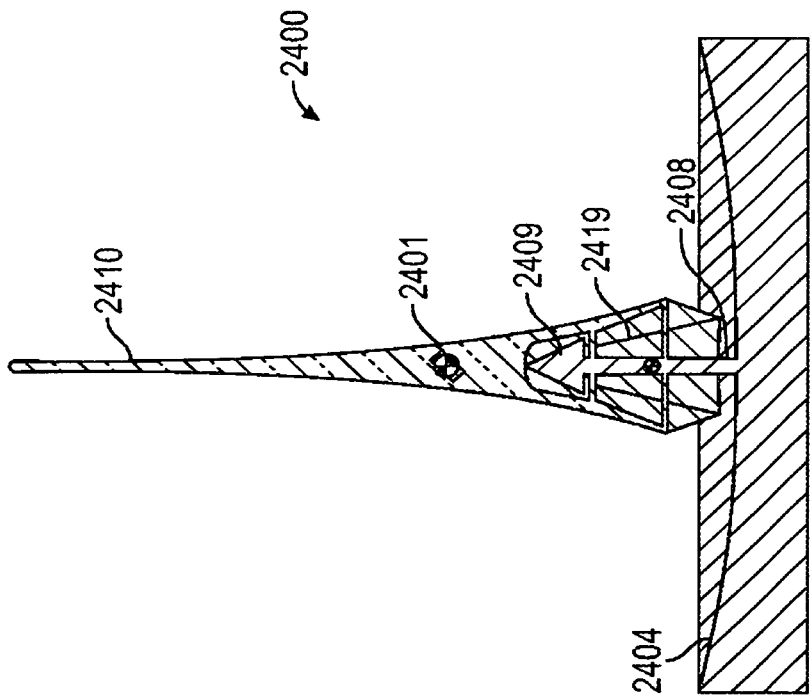
FIGS. 24A-24B are cross-section views of another embodiment of an electric lighting device.
Figure 24B:
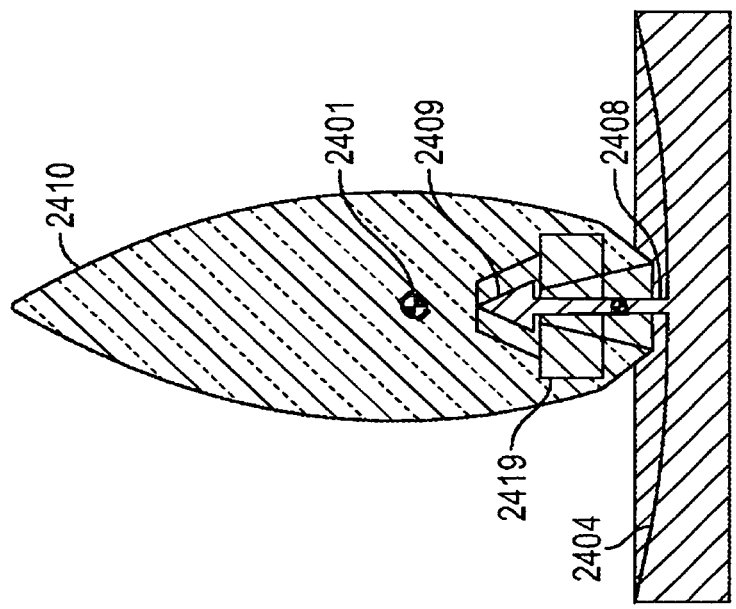

FIGS. 24A-24B illustrate another embodiment of an electric lighting device 2400 having an outer housing with an upper surface 2404. A support member 2408 extends upwardly from the upper surface 2404, and preferably originates from a recessed area or valley of the upper surface 2404. The support member 2408 is preferably embedded or molded into the upper surface 2404 during manufacture of the housing but can otherwise be coupled to the upper surface 2404.

Device can include a flame element 2410 having an inwardly tapered lower portion with a weight 2419 coupled to the bottom or lower portion. Weight 2419 advantageously lowers the center of gravity 2401 of the flame element 2410 to below the pivot point. It is contemplated that the weight 2419 can be molded or embedded into the flame element 2410 during manufacture or coupled to the flame element 2410 afterwards.

The support member 2408 terminates at a first end 2409 having a tapered surface, such that a bottom portion of the first end 2409 has a width that is greater than the lower portion of the support member 2408. Because a width of the bottom portion of the first end 2409 overlaps with the weight 2419, removal of the flame element 2410 form the support member 2408 is inhibited. With respect to the remaining numerals in each of FIGS. 24A-24B, the same considerations for like components with like numerals of FIG. 1 apply.

Figure 25B:
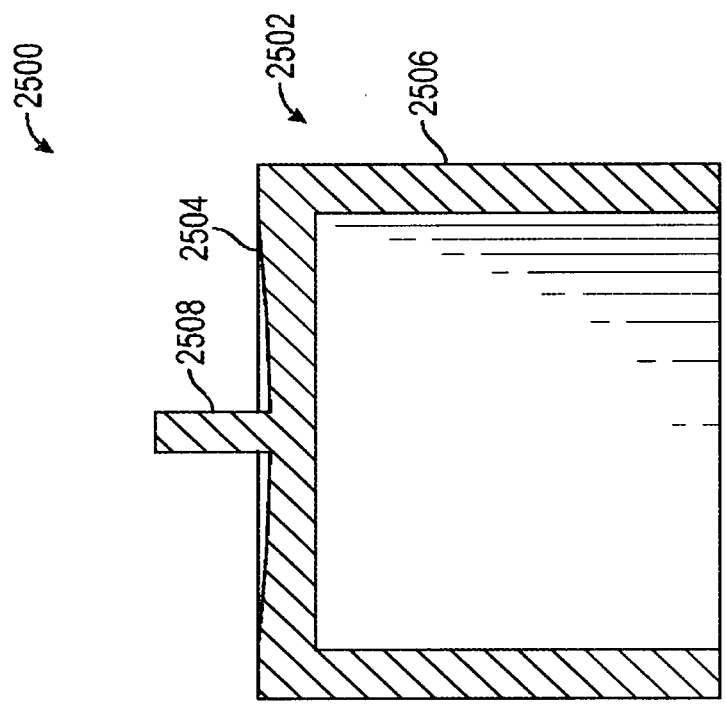
FIGS. 25A-25B are a side view and cross-section view, respectively, of one embodiment of a housing and support member.
Figure 25A:
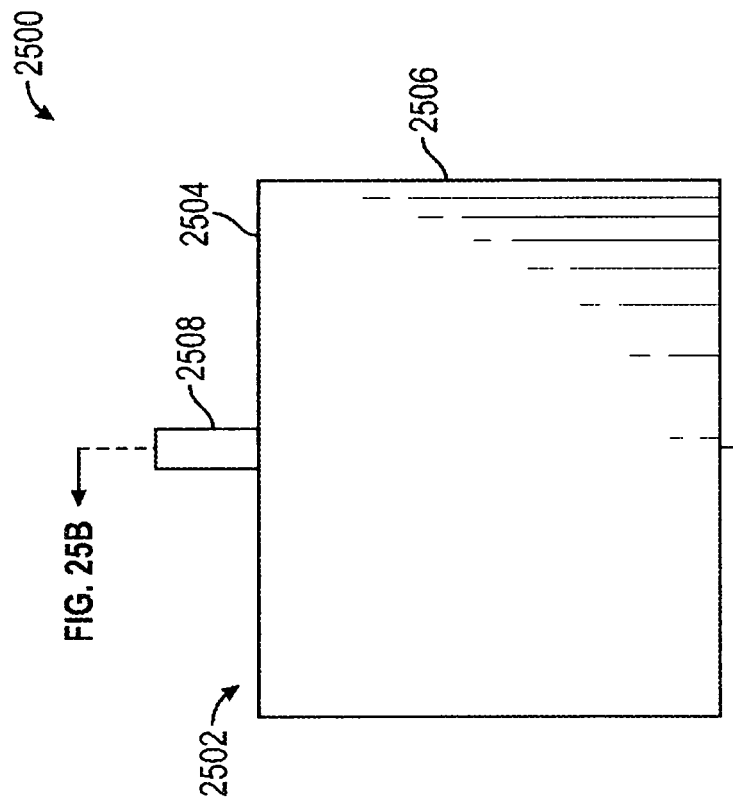

FIGS. 25-25B illustrate one embodiment of a housing 2502 of an electric lighting device 2500 having an upper surface 2504 coupled to a sidewall 2506. Device 2500 includes a support member 2508 that is molded as one piece with the housing 2502, and that extends upwardly from an upper surface 2504 of the housing 2502.

Figure 26B:
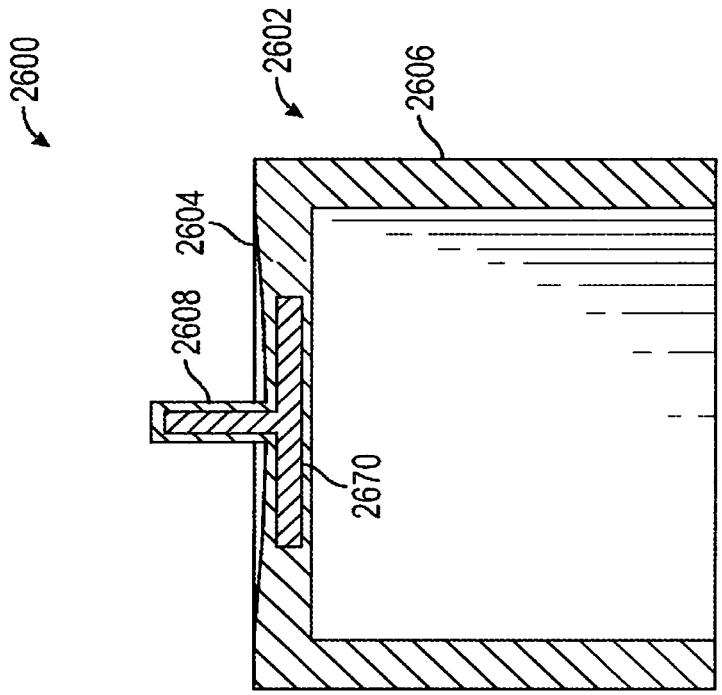
FIGS. 26A-26B are a side view and cross-section view, respectively, of one embodiment of a housing and support member.
Figure 26A:
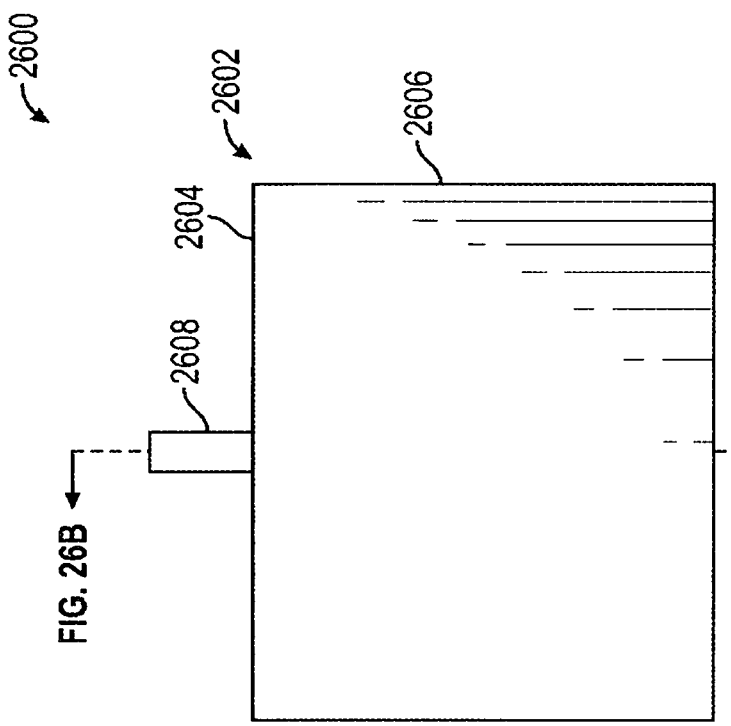

To strengthen the support member 2608 and thereby help prevent snapping or breaking, a stiffener 2670 can be molded within the upper surface 2604 and the support member 2608, as shown in FIGS. 26A-26B. With respect to the remaining numerals in each of FIGS. 26A-26B, the same considerations for like components with like numerals of FIG. 25B apply.

Alternatively as shown in FIGS. 27A-27B, a stiffener 2772 can be added externally to the support member 2708 to help prevent breaking or other damage to the support member 2708. With respect to the remaining numerals in each of FIGS. 27A-27B, the same considerations for like components with like numerals of FIG. 25B apply.

Figure 28B:
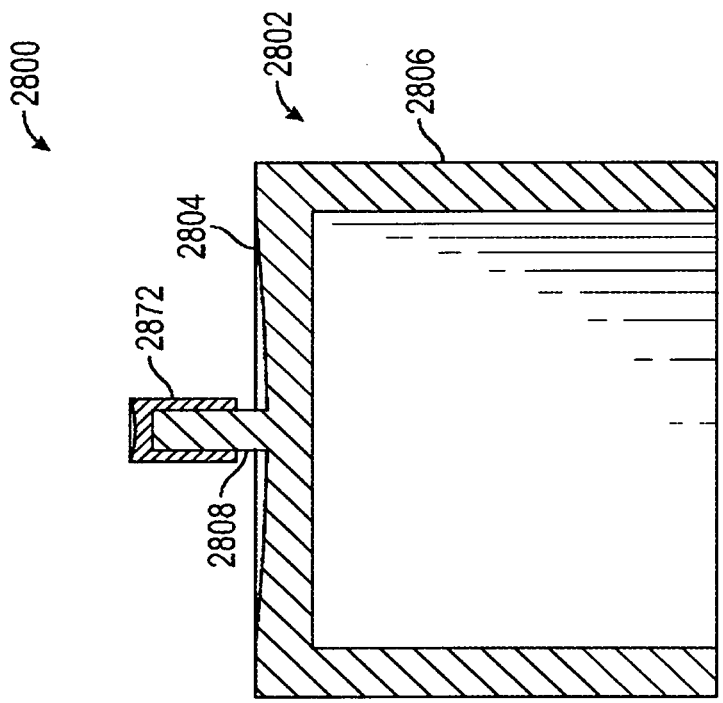
FIGS. 28A-28B are a side view and cross-section view, respectively, of one embodiment of a housing and support member.
Figure 28A:
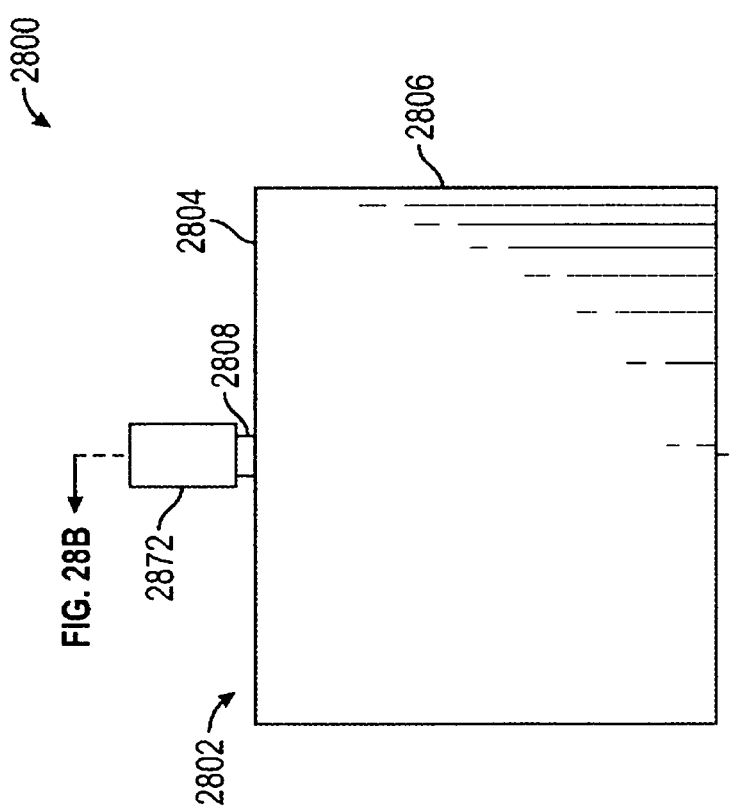

As shown in FIGS. 28A-28B, the stiffener 2872 can be added externally to the support member 2808 and include inward projections that mate with notches on the support member 2808 to thereby snap the stiffener 2872 on to the support member 2808. With respect to the remaining numerals in each of FIGS. 28A-28B, the same considerations for like components with like numerals of FIG. 25B apply.

Figure 29B:
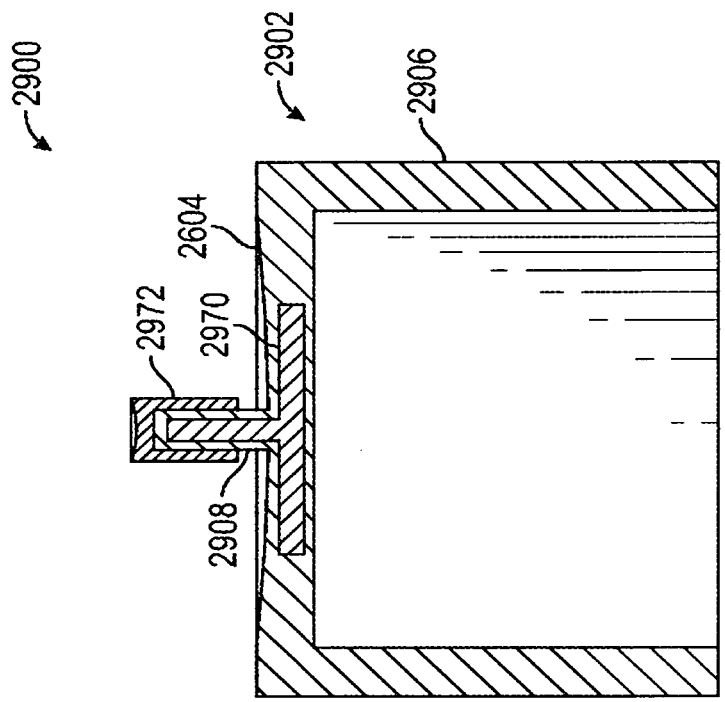
FIGS. 29A-29B are a side view and cross-section view, respectively, of one embodiment of a housing and support member.
Figure 29A:
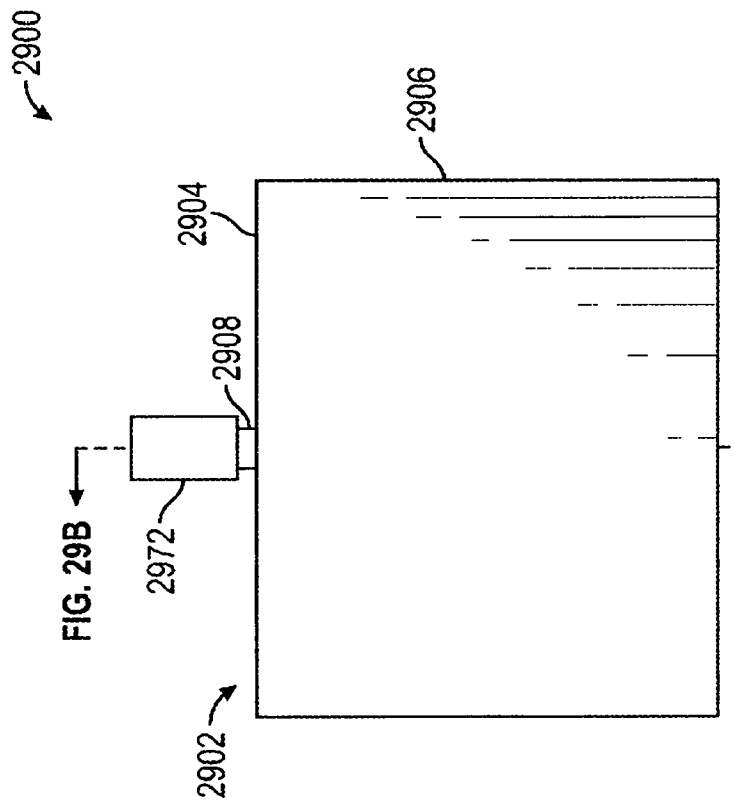

For further strengthening of the support member 2908, a first stiffener 2970 can be embedded into the support member 2908 and upper surface 2904, while a second stiffener 2972 can be attached to an external surface of the support member 2908, as shown in FIGS. 29A-29B. With respect to the remaining numerals in each of FIGS. 29A-29B, the same considerations for like components with like numerals of FIG. 25B apply.

Figure 30C:
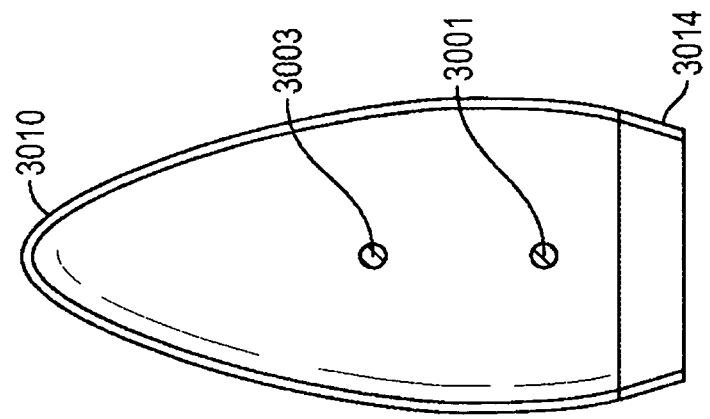
FIGS. 30A-30C are schematics illustrating centers of gravity for different configurations of flame elements.
Figure 30B:
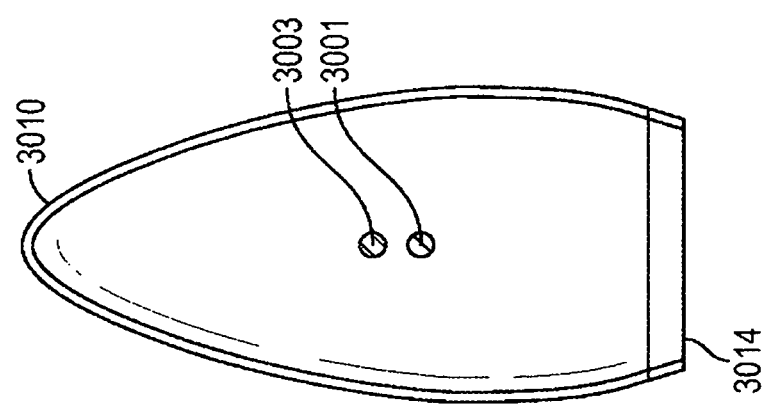
Figure 30A:
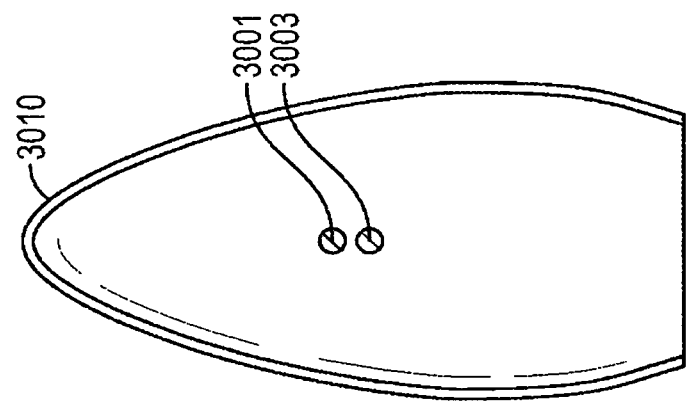

FIGS. 30A-30C illustrate how added weight whether by one or more magnets or a separate weight 3014 can affect the center of gravity 3001 of the flame element 3010 relative to the pivot point 3003.

Figure 31:
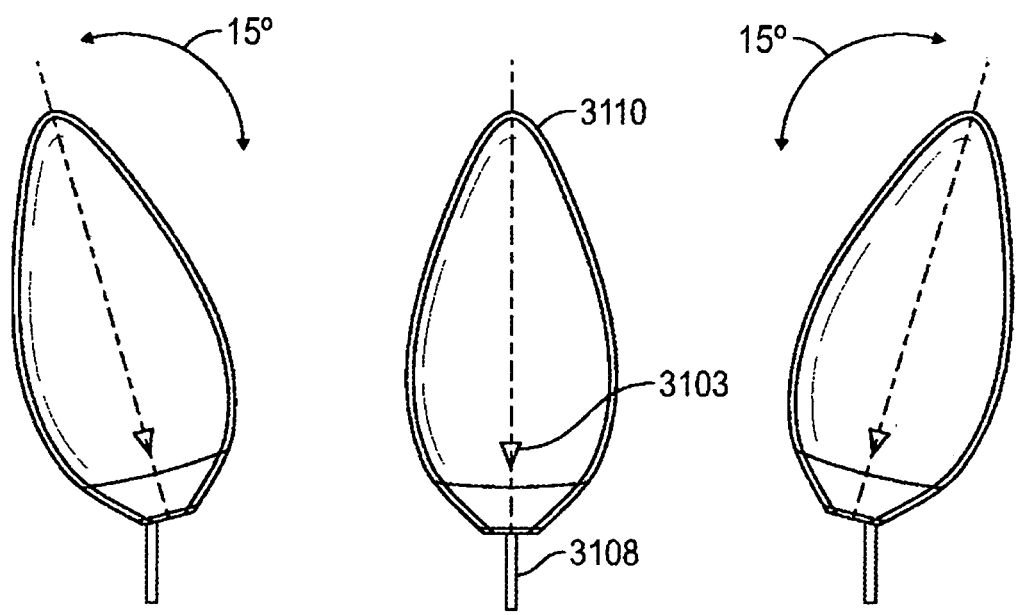
FIG. 31 is a schematic showing exemplary dimensions for rotation of one embodiment of a flame element.

FIG. 31 illustrates one embodiment of a flame element 3110 having a diameter of 0.12 inches (3.048 mm) at the aperture into which a support member 3108 is inserted. This diameter advantageously allows the flame element to rotate 15 degrees with a pivot point that is 0.15 inches (3.81 mm) above the aperture.

Figure 32B:
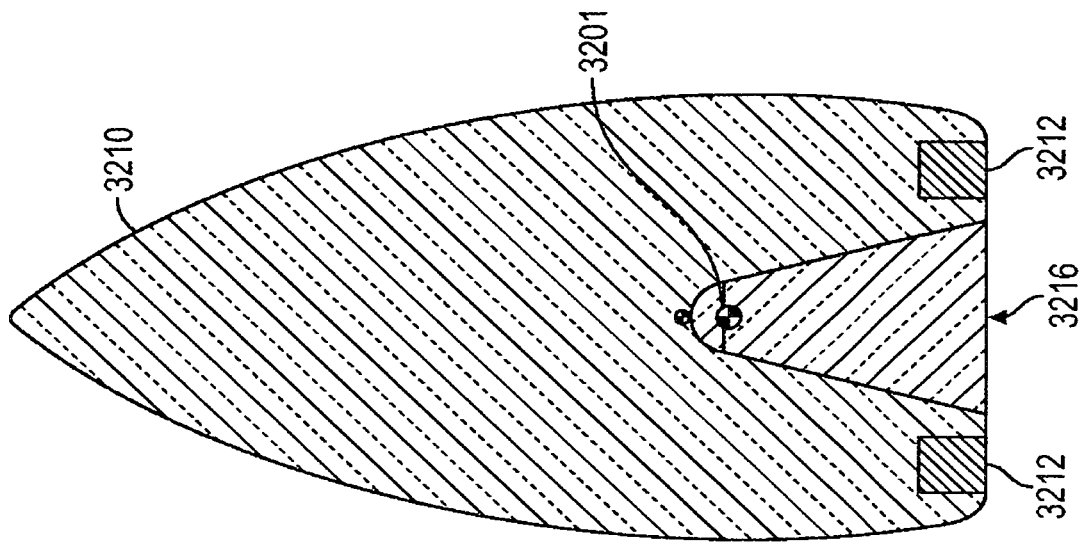
FIGS. 32A-32B are perspective and cross-section views of a schematic of one embodiment of a flame element.
Figure 32A:
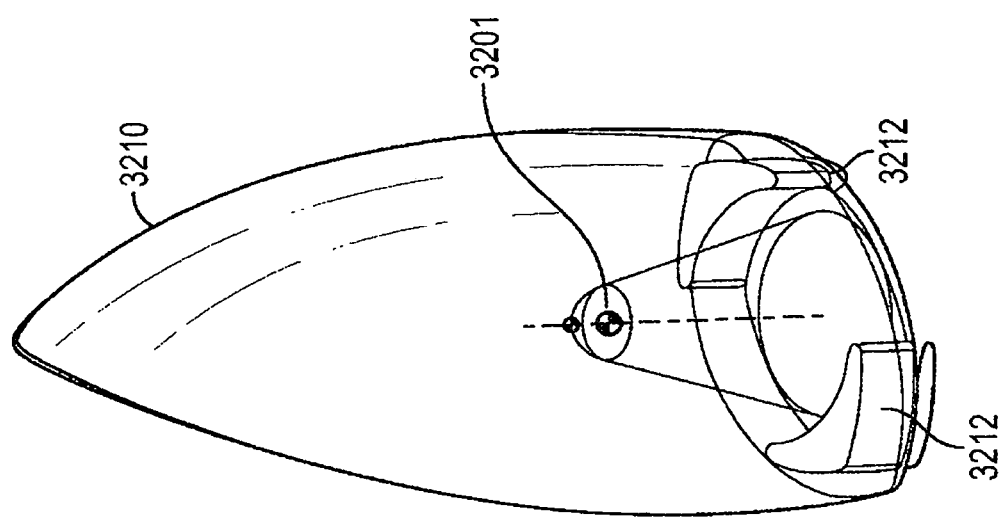

FIGS. 32A-32B illustrates the use of custom-shaped magnets 3212 that can be coupled to or embedded within the flame element 3210. Using a precisely-shaped magnet allows for the lower portion of the flame element 3210 to be tapered inwardly, while also lowering the center of gravity 3201 of the flame element 3210 to below the pivot point. With respect to the remaining numerals in each of FIGS. 32A-32B, the same considerations for like components with like numerals of FIG. 1 apply.

FIGS. 33A-33B illustrate the use of a custom-shaped ring magnet 3312. With respect to the remaining numerals in each of FIGS. 33A-33B, the same considerations for like components with like numerals of FIG. 1 apply.

Figure 34B:
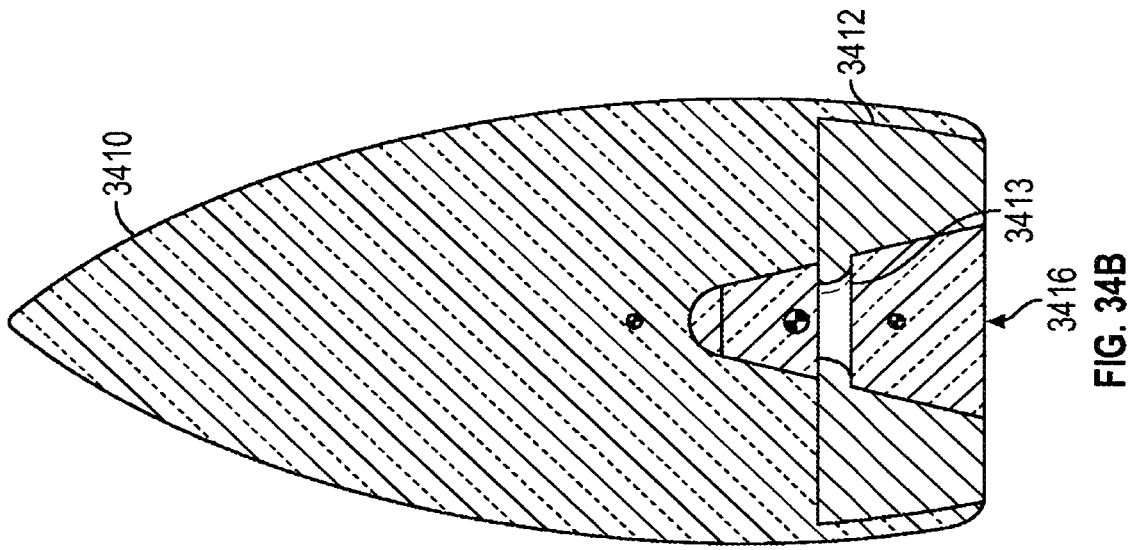
FIGS. 34A-34B are perspective and cross-section views of a schematic of one embodiment of a flame element.
Figure 34A:
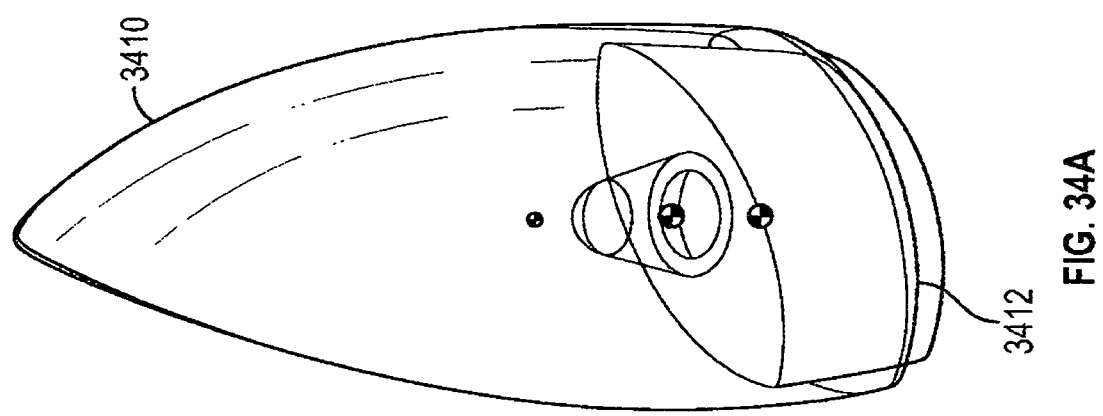

FIGS. 34A-34B illustrate the use of a different custom-shaped ring magnet 3412 having an internal projection 3413 that helps to prevent removal of a support member from the flame element once inserted. With respect to the remaining numerals in each of FIGS. 34A-34B, the same considerations for like components with like numerals of FIG. 1 apply.

FIGS. 35A-35B illustrate the use of a different custom-shaped ring magnet 3512. With respect to the remaining numerals in each of FIGS. 35A-35B, the same considerations for like components with like numerals of FIG. 1 apply.

FIGS. 36A-36C depict another embodiment of an electric lighting device 3600 having a housing 3602 with an upper surface 3604. A flame element 3610 can be supported above the upper surface 3604 via a fastener 3608 that extends through the upper surface 3604, as shown in FIG. 36C. The flame element 3610 can also include a ring-shaped magnet 3612. With respect to the remaining numerals in each of FIGS. 36A-36C, the same considerations for like components with like numerals of FIG. 1 apply.

Figure 37:
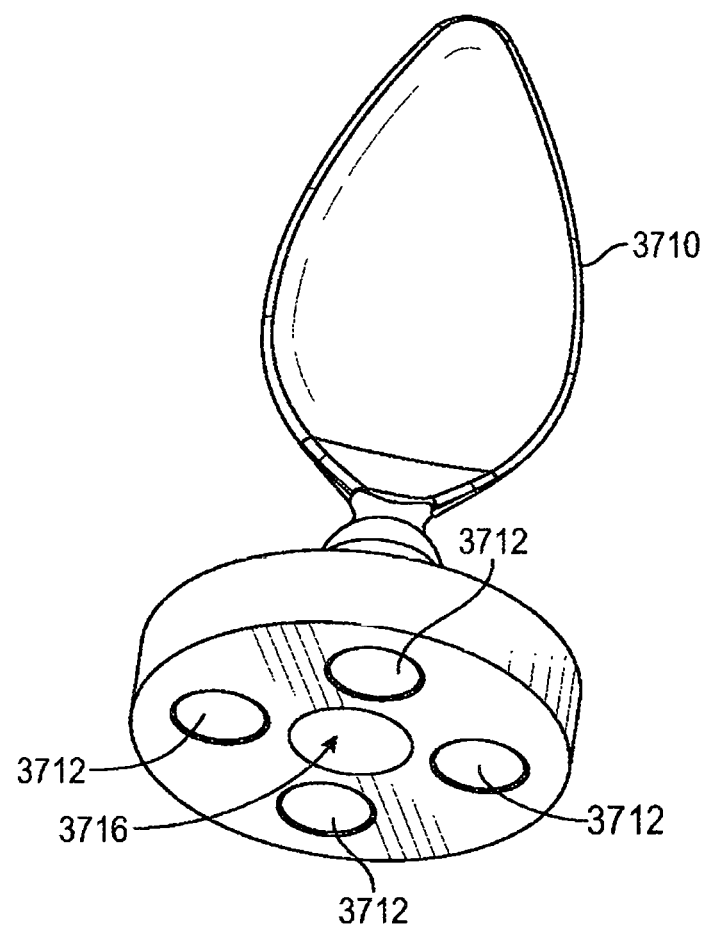
FIG. 37 is a bottom, perspective view of another embodiment of a flame element for an electric lighting device.

FIG. 37 depicts one embodiment of a flame element 3710 for an electric lighting device having four magnets 3712 disposed at a lower portion of the flame element 3710 about an aperture that leads into a hollow interior portion 3716. With respect to the remaining numerals in FIG. 37, the same considerations for like components with like numerals of FIG. 1 apply.

Figures 38A, 38B:
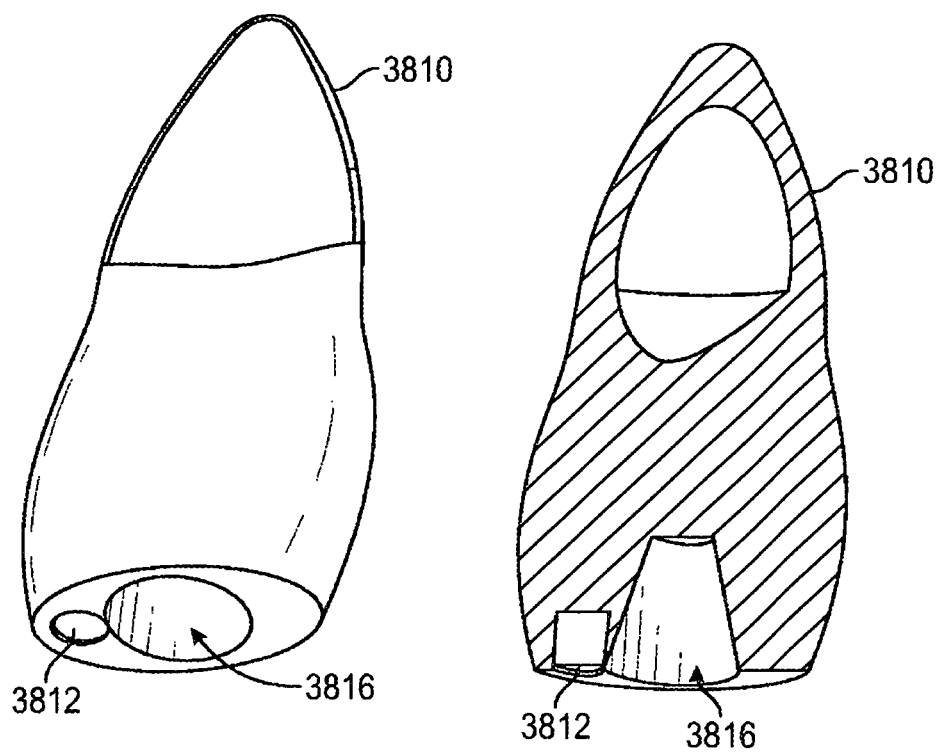
FIGS. 38A-38B are a bottom, perspective view and a cross-section view, respectively, of another embodiment of a flame element for an electric lighting device.

FIG. 38 depicts another embodiment of a flame element 3810 for an electric lighting device having a single magnet 3812 disposed on one side of the flame element 3810 adjacent to an aperture that leads into a hollow interior portion 3816. With respect to the remaining numerals in FIG. 38, the same considerations for like components with like numerals of FIG. 1 apply.

Figure 39:
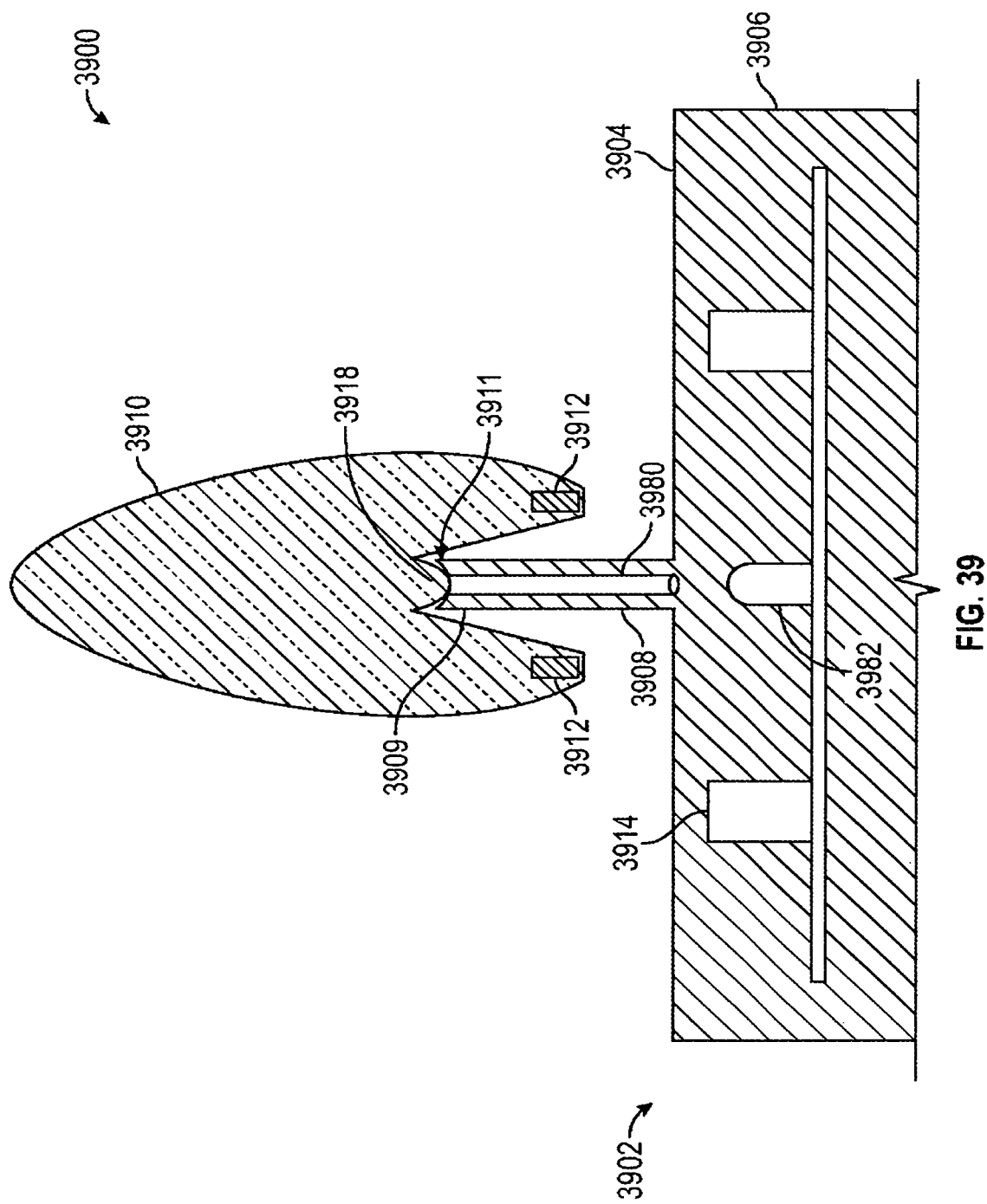
FIG. 39 is a cross-section view of one embodiment of an electric lighting device.

FIG. 39 shows another embodiment of an electric lighting device 3900. A light source 3982 can be disposed within the candle housing 3902 and beneath the support member 3908. In such embodiment, it is preferred that the support member comprises an internal cavity or light pipe into which light from the light source 3982 can be emitted. This advantageously allows, for example, light to pass through the support member 3908 to illuminate the flame element 3910 from within. Alternatively or additionally, light from the light source 3982 can be used to create a glowing ember effect for the support member 3908, which could simulate a glowing wick, for example. With respect to the remaining numerals in FIG. 39, the same considerations for like components with like numerals of FIG. 1 apply.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N. or B plus N, etc.

The invention claimed is:

1. An electric lighting device, comprising:
a candle body having sidewalls, and an upper surface coupled to the sidewalls, defining an inner cavity of the candle body inside the sidewalls;
a support member extending upwardly from the upper surface and terminating at a first end;
a flame shaped element disposed outside of the candle body, supported by the support member, said flame shaped element having a bottom portion with a support surface adapted to press against said first end of said support member;
a first magnetic-attractable material on a first side of a bottom portion of the flame shaped element;
a second magnetic-attractable material on a second side of a bottom portion of the flame shaped element;
where the first material and the second material are on opposite ends of the bottom of the flame shaped element symmetrically disposed relative to one another,
wherein the support surface of the flame shaped element pivots on the first end of the support member; and
an electromagnet configured to generate an electromagnetic field that interacts with the first and second materials of the flame element to thereby cause the flame shaped element to pivot.

2. The electric lighting device of claim 1, wherein the electromagnet is disposed within the candle body and beneath the upper surface.

3. The electric lighting device of claim 1, wherein the electromagnet is has a first part closer to the first material and has a second part closer to the second material.

4. The electric lighting device of claim 1, wherein the electromagnet concentrically surrounds the bottom portion of the flame shaped element.

5. The electric lighting device of claim 1, further comprising a light source positioned to produce light on to the flame element.

6. The electric lighting device of claim 5, wherein the light source is disposed entirely within the candle body and emits said light via an aperture in the upper surface.

7. The electric lighting device of claim 1, wherein the flame element has inner surfaces defining a hollow interior portion between the first side of the bottom portion of the flame shaped element and the second side of the bottom portion of the flame shaped element, and between the first and second material.

8. The electric lighting device of claim 7, wherein the first end of the support member has a recess, and the flame element has a projection, inside the hollow interior portion, that extends downwardly, and wherein the projection is configured to rest on the recess.

9. The electric lighting device of claim 1, further comprising a retaining structure that retains the flame element relative to the support member, while allowing the flame element to pivot relative to the support member.

10. The electric lighting device as in claim 9, wherein the retaining structure includes a flexible extension, attached to the support, that presses against inner surfaces of the flame element to hold the inner surfaces of the flame element from coming off of the support.

11. The electric lighting device as in claim 9, wherein the retaining structure includes an insert that is inserted into the inner surfaces of the flame element after the flame element is inserted onto the support.

12. The electric lighting device of claim 5, wherein the light source is disposed entirely within the candle body and emits said light via a light pipe configured to direct light from the light source through the support member.

13. An electric lighting device, comprising:
a candle body having sidewalls, and an upper surface coupled to the sidewalls, defining an inner cavity of the candle body inside the sidewalls;
a support member extending upwardly from the upper surface and terminating at a first end,
a flame shaped element disposed outside of the candle body, supported by the support member,
said flame shaped element having a bottom portion with a support surface adapted to press against said first end of said support member;
at least one magnetic-attractable material attached to the flame shaped element;
wherein the support surface of the flame shaped element pivots on the first end of the support member and the flame shape element is retained by a retaining structure against being removed completely from the first end of the support member; and
an electromagnet configured to generate an electromagnetic field that interacts with the at least one magnetic-attractable material to cause the flame shaped element to pivot.

14. The device as in claim 13, wherein the at least one magnetic-attractable material includes a first magnetic-attractable material on a first side of a bottom portion of the flame shaped element;
a second magnetic-attractable material on a second side of a bottom portion of the flame shaped element;
where the first material and the second material are on opposite ends of the bottom of the flame shaped element symmetrically disposed relative to one another.

15. The electric lighting device of claim 13, wherein the electromagnet concentrically surrounds the bottom portion of the flame shaped element.

16. The electric lighting device of claim 13, further comprising a light source positioned to produce light on to the flame element.

17. The electric lighting device of claim 16, wherein the light source is disposed entirely within the candle body, and the candle body is sealed.

18. The device as in claim 17, wherein the light source emits said light via an aperture in the upper surface.

19. The device as in claim 17, wherein the light source emits said light via an aperture in the upper surface.

20. The electric lighting device of claim 13, wherein the flame shaped element includes inner surfaces defining a hollow interior portion and the retaining structure includes a flexible extension arm, attached to the support, that presses against inner surfaces of the flame element to hold the inner surfaces of the flame element from coming off of the support.

21. The electric lighting device as in claim 13, wherein the flame shaped element includes inner surfaces defining a hollow interior portion and the retaining structure includes an insert that is inserted into the inner surfaces of the flame element after the flame element is inserted onto the support.

* * * * *